(12) United States Patent
IIzuka

(10) Patent No.: US 9,558,046 B2
(45) Date of Patent: Jan. 31, 2017

(54) COMPUTER SYSTEM AND PROGRAM FOR PRIOR VERIFICATION OF A WORKFLOW PROGRAM

(71) Applicant: Hitachi, Ltd., Tokyo (JP)

(72) Inventor: Daisuke IIzuka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 79 days.

(21) Appl. No.: 14/391,631

(22) PCT Filed: Sep. 28, 2012

(86) PCT No.: PCT/JP2012/075173
§ 371 (c)(1),
(2) Date: Oct. 9, 2014

(87) PCT Pub. No.: WO2014/049854
PCT Pub. Date: Apr. 3, 2014

(65) Prior Publication Data
US 2015/0067697 A1 Mar. 5, 2015

(51) Int. Cl.
*G06F 9/52* (2006.01)
*G06F 11/22* (2006.01)

(52) U.S. Cl.
CPC ........... *G06F 9/52* (2013.01); *G06F 11/22* (2013.01)

(58) Field of Classification Search
None
See application file for complete search history.

(56) References Cited

U.S. PATENT DOCUMENTS 5,999,911 A * 12/1999 Berg .................. G06F 17/50
 705/7.13
6,430,538 B1 * 8/2002 Bacon ............... G06Q 10/06316
 705/7.21
2005/0228855 A1 10/2005 Kawato
(Continued)

FOREIGN PATENT DOCUMENTS

JP 2005-266917 A 9/2005
JP 2008-234276 A 10/2008
(Continued)

*Primary Examiner* — Emerson Puente
*Assistant Examiner* — Jonathan R Labud
(74) *Attorney, Agent, or Firm* — Volpe and Koenig, P.C.

(57) ABSTRACT

It is provided a computer system comprising a management computer to be coupled to a management subject resource managed by the management computer, which includes at least one of a server apparatus, a storage apparatus or a network apparatus, and a display computer coupled to the management computer. The management computer includes a memory storing at least one workflow program including a work procedure, and a CPU configured to execute the at least one workflow program. The work procedure changes a configuration of the management subject resource, and acquires information from the management subject resource. The CPU executes prior verification processing of verifying an operation environment of the management subject resource to operate the work procedure included in the at least one workflow program before execution of the at least one workflow program, and displays an execution result of the prior verification processing on the display computer.

4 Claims, 16 Drawing Sheets

(56) References Cited

U.S. PATENT DOCUMENTS

| | | | |
|---|---|---|---|
| 2009/0125366 A1* | 5/2009 | Chakraborty | G06Q 10/087 717/117 |
| 2010/0082812 A1* | 4/2010 | Brady | H04L 41/0806 709/226 |
| 2010/0115520 A1 | 5/2010 | Kohno et al. | |

FOREIGN PATENT DOCUMENTS

| | | |
|---|---|---|
| JP | 2011-100369 A | 5/2011 |
| WO | 2010/050524 A1 | 5/2010 |

\* cited by examiner

| | | | | | | 210 |
|---|---|---|---|---|---|---|
| FLOW ID 211 | FLOW NAME 212 | PLANNED EXECUTION TIME AND DATE 213 | DEPENDING FLOW ID 214 | DEPENDED FLOW ID 215 | EXECUTION RESULT 216 | VERIFICATION RESULT 217 |
| 1 | STORAGE SETTING FOR ORDER PLACEMENT SYSTEM | 2012/8/1 12:00 | - | 4 | SUCCESSFUL | VERIFIED |
| 2 | NETWORK SETTING FOR ORDER PLACEMENT SYSTEM | 2012/8/1 12:10 | - | 4,5 | BEING EXECUTED | VERIFIED |
| 3 | OS EMERGENCY PATCH APPLICATION | 2012/8/1 18:00 | - | 4 | UNEXECUTED | VERIFIED |
| 4 | DB SETTING FOR ORDER PLACEMENT SYSTEM | 2012/8/2 14:00 | 1,2,3 | 6 | UNEXECUTED | PARTIALLY UNVERIFIED |
| 5 | AP-USE VM CONSTRUCTION FOR ORDER PLACEMENT SYSTEM | 2012/8/2 11:00 | 2 | 6 | FAILED | PARTIALLY UNVERIFIED |
| 6 | AP SETTING FOR ORDER PLACEMENT SYSTEM | 2012/8/3 10:00 | 4,5 | - | UNEXECUTED | VERIFICATION FAILED |
| | | | | | | |

*Fig. 3*

| FLOW ID (221) | PROCEDURE NUMBER (222) | PROCEDURE NAME (223) | PROCEDURE TYPE (224) | OPERATION SUBJECT HOST NAME (225) | PARAMETER (226) | CHANGED CI (227) | DEPENDING CI (228) | DEPENDING FLOW (229) |
|---|---|---|---|---|---|---|---|---|
| 1 | 1 | VOLUME GENERATION | LU GENERATION | storage1 | size=1TB LUN=1 WWN=wwn1 format=xxfs | storage1/LUN | storage1 | - |
| 2 | 1 | TAG VLAN=10 | TAG VLAN ADDITION | switch1 | port=1 VLANID=10 | switch1/port1 | switch1 | - |
| 3 | 1 | PATCH APPLICATION | COMMAND EXECUTION | vm1 | cmd=installpatch args=-f patchsvr | vm1 | vm1 | - |
| 4 | 1 | VOLUME ADDITION | LU ADDITIONAL ASSIGNMENT | hyper1 | WWN=wwn1 LUN=1 VM=vm1 | hyper1 vm1 | storage1/LUN1 | 1 |
| 4 | 2 | VOLUME RECOGNITION | COMMAND EXECUTION | vm1 | cmd=scsirescan args= | vm1 | storage1/LUN1 | - |
| 4 | 3 | VOLUME MOUNTING | COMMAND EXECUTION | vm1 | cmd=mount args=/dev/sda /db | vm1 | vm1 | - |
| 4 | 4 | DB SETTING | COMMAND EXECUTION | vm1 | cmd=dbsetup args=mydb1 /db | vm1/mydb | vm1 | - |
| 5 | 1 | AP-USE VM GENERATION | VM GENERATION | hyper1 | vm=vm2 img=apvm.vhd conf=apvm.conf | hyper1 vm2 | vm1/mydb hyper1 | 2 |
| ... | ... | ... | ... | ... | ... | ... | ... | ... |
| 6 | 1 | AP INSTALLATION | COMMAND EXECUTION | vm1 | cmd=apsetup args=ap.conf | vm2/ap | vm2 vm1/mydb | - |
| ... | ... | ... | ... | ... | ... | ... | ... | ... |

| VERIFICATION ID 231 | FLOW ID 232 | PRIOR VERIFICATION NAME 233 | CORRE-SPONDING PROCEDURE 234 | VERIFICATION SCRIPT 235 | VERIFICATION EXECUTION HOST 236 | DEPENDING FLOW ID 237 | VALID/ INVALID 238 |
|---|---|---|---|---|---|---|---|
| 1 | 1 | STORAGE APPARATUS PRESENCE CHECK | 1 | ping.bat %host% | test1 | - | VALID |
| 2 | 1 | STORAGE APPARATUS LOGIN | 1 | smislogin.bat %host% | test1 | - | VALID |
| 3 | 1 | LU GENERATION ABSENCE CHECK | 1 | noLUexists.bat %host% %LUN% | test1 | - | VALID |
| 4 | 2 | NETWORK SWITCH PRESENCE CHECK | 1 | ping.bat %host% | test1 | - | VALID |
| 5 | 2 | NETWORK SWITCH LOGIN CHECK | 1 | swlogin.bat %host% | test1 | - | VALID |
| 6 | 2 | VLAN SETTING ABSENCE CHECK | 1 | notagVLAN.bat %host% %VLAN% | test1 | - | VALID |
| ... | ... | ... | ... | ... | ... | ... | ... |
| 8 | 4 | HOST PRESENCE CHECK | 1 | ping.bat %host% | test1 | - | VALID |
| 9 | 4 | HOST PRESENCE CHECK | 2,3,4 | ping.bat %host% | test1 | - | VALID |
| 10 | 4 | HOST LOGIN CHECK | 1 | login.bat %host% | test1 | - | VALID |
| 11 | 4 | HOST LOGIN CHECK | 2,3,4 | login.bat %host% | test1 | - | VALID |
| 12 | 4 | LU PRESENCE CHECK | 1 | LUexsits.bat %LUN% | test1 | 1 | INVALID |
| 13 | 4 | EXECUTABLE FILE PRESENCE CHECK | 2,3,4 | exeexists.bat %cmd% | %host% | - | VALID |
| 14 | 5 | HOST ABSENCE CHECK | 1 | noping.bat –timeout 30 %host% | test1 | 3 | VALID |
| ... | ... | ... | ... | ... | ... | ... | ... |
| 16 | 6 | AP INSTALLATION ABSENCE CHECK | 1 | noninstall.bat ap | %host% | 4 | INVALID |
| ... | ... | ... | ... | ... | ... | ... | ... |

Fig. 5

PRIOR VERIFICATION RESULT COMPARISON

FLOW NAME: NETWORK SETTING FOR ORDER PLACEMENT SYSTEM
START TIME: 2012/8/1 12:10
END TIME : 2012/8/1 12:15

[DISPLAY FLOWS IN OPERATION IN THIS TIME PERIOD]

| FLOW NAME | VERIFICATION ID | PRIOR VERIFICATION NAME | VERIFICATION RESULT BEFORE EXECUTION | VERIFICATION RESULT AFTER EXECUTION | REASON FOR CHANGE IN VERIFICATION RESULT |
|---|---|---|---|---|---|
| DB SETTING FOR ORDER PLACEMENT SYSTEM | 11 | HOST LOGIN CHECK | ✓SUCCESSFUL VERIFICATION | ✓SUCCESSFUL VERIFICATION | |
| | 12 | LU PRESENCE CHECK | ⊕PARTIALLY UNVERIFIED | ✓SUCCESSFUL VERIFICATION | OPERATION ENVIRONMENT CONSTRUCTION |
| | 13 | EXECUTABLE FILE PRESENCE CHECK | ✓SUCCESSFUL VERIFICATION | ✗VERIFICATION FAILED | OPERATION ENVIRONMENT DESTRUCTION |
| AP-USE VM CONSTRUCTION FOR ORDER PLACEMENT SYSTEM | 14 | HOST ABSENCE CHECK | ✓SUCCESSFUL VERIFICATION | ✓SUCCESSFUL VERIFICATION | |
| ... | ... | ... | ... | ... | ... |

FLOW DEPENDENCY LIST — 340

351 — Time and Date
| | TIME AND DATE |
|---|---|
| START | 2012/8/1 0:00 |
| END | 2012/8/4 0:00 |

350 / 348 — Legend
| LEGEND | DISPLAY |
|---|---|
| ✓ : SUCCESSFUL | ☑ |
| ⊕ : PARTIALLY UNVERIFIED | ☑ |
| ✗ : FAILED | ☑ |

341 — Dependency Matrix

| DEPENDING SOURCE FLOW (342) | STORAGE SETTING FOR ORDER PLACEMENT SYSTEM | NETWORK SETTING FOR ORDER PLACEMENT SYSTEM | OS EMERGENCY PATCH APPLICATION | DB SETTING FOR ORDER PLACEMENT SYSTEM | AP-USE VM CONSTRUCTION FOR ORDER PLACEMENT SYSTEM | AP SETTING FOR ORDER PLACEMENT SYSTEM |
|---|---|---|---|---|---|---|
| NUMBER OF DIRECT DEPENDENCIES (346) | 1 | 2 | 1 | 1 | 1 | 0 |
| NUMBER OF INDIRECT DEPENDENCIES (347) | 2 | 2 | 2 | 1 | 1 | 0 |
| STORAGE SETTING FOR ORDER PLACEMENT SYSTEM | — | | | | | |
| NETWORK SETTING FOR ORDER PLACEMENT SYSTEM | | — | | | | |
| OS EMERGENCY PATCH APPLICATION | | | — | | | |
| DB SETTING FOR ORDER PLACEMENT SYSTEM | ✓ | ✓ | ⊕ | — | | |
| AP-USE VM CONSTRUCTION FOR ORDER PLACEMENT SYSTEM | | ✓ | | | — | |
| AP SETTING FOR ORDER PLACEMENT SYSTEM | | | | ⊕ | ✗ | — |

COMPUTER SYSTEM AND PROGRAM FOR PRIOR VERIFICATION OF A WORKFLOW PROGRAM

BACKGROUND OF THE INVENTION

This invention relates to a computer system for executing a workflow program including work procedures, and more particularly, to a computer system for executing prior verification processing of verifying an operation environment of a management subject resource for an operation of the work procedure.

When a computer system including management subject resources (information technology (IT) resources) including at least one of a server, a network, or a storage is operated, work for changing a configuration of the management subject resource is necessary. The work for changing the configuration of the management subject resource includes work of installing software, and a setup work for software including setting of parameters. If a worker manually carries out the configuration change work, a work period may increase due to additional work caused by a work error due to unfamiliarity and inattentiveness of the worker. The following automated processing is prevailing. Specifically, in order to prevent the work period from extending, a management computer included in the computer system converts the manual configuration change work into an automatic operation flow such as a script in advance. Then, a small number of parameters are input to the management computer, and the management computer carries out an automated operation flow, thereby carrying out the configuration change work in a short period requiring almost no human intervention. The automated processing is realized by the management computer carrying out the automated flow based on the automated flow or job describing in which sequence and on which host various procedures of the automated processing such as execution commands, command lines, and scripts are executed when a predetermined condition is satisfied. It should be noted that the predetermined condition includes a case where a predetermined time has elapsed after the automated flow has been once carried out, a case where a schedule set in advance is reached, and a case where a predetermined event is generated.

Work for checking whether the automated flow is carried out on schedule, or is carried out without a problem is necessary for the management computer to surely carry out the automated flow without a problem.

As the background art of this technical field, there are known Japanese Patent Application Laid-open JP 2008-234276 A and International Patent Publication WO 2010/050524 A.

In Japanese Patent Application Laid-open JP 2008-234276 A, there is a description (refer to Abstract) that "If a scheduled operation of a job needs to be executed at time and date other than system time and date of a host, instructions of the time and date and a progress speed of time are issued from the local time and date and progress speed instruction part 102. The virtual time management part 103 calculates local time and date while using information on the instructed time and date and progress speed of time and system time and date 104 as inputs, and notifies the schedule management part 105 thereof. The schedule management part 105 reads the schedule definition 107, and requests a notification of a notification time list 109 listing start times of jobs which can be executed starting from the local time and date from the virtual time and date management part 103. If jobs which can be executed at the local time and date exist, the schedule management part 105 notifies the execution part 110 of the jobs, and controls the execution part 110 to read a job execution definition 108 from the job information storage part 10 and execute the job execution definition 108."

Moreover, in International Patent Publication WO 2010/050524 A, there is a description (refer to Abstract) that "This invention provides a computer system for managing a batch job. The computer system includes: a storage part for storing at least one job template; and an execution part for executing generation or update of a job net definition following a condition defined in the at least one job template, generation or update a job net, or discovery of a conflict of a job by using at least one attribute or a relationship in a set of data including at least one predetermined attribute of a configuration element and a relationship between the configuration element and another configuration element, the set of data being held in a repository and updatable by discovery of detecting information on a configuration element."

SUMMARY OF THE INVENTION

In Japanese Patent Application Laid-open JP 2008-234276 A, there is described a method of increasing efficiency of a test for a job schedule. Moreover, in International Patent Publication WO 2010/050524 A, there is described extraction of a conflict where execution time periods of two jobs overlap each other, and presentation of the extracted conflict to a job designer in order to correctly design a sequence between jobs. However, Japanese Patent Application Laid-open JP 2008-234276 A and International Patent Publication WO 2010/050524 A have such a problem that a failure of the management computer in execution of a procedure included in an automated flow cannot be detected before the automated flow is executed. Causes for the failure of the management computer in execution of the procedure included in the automated flow include such a cause that a specified host does not exist, such a cause that a user name or a password is incorrect, and logging into the specified host thus cannot be carried out, such a cause that an execution command does not exist, and such a cause that an execution permission for an execution command does not exist.

This invention has an object to provide a computer system which can detect a failure of a management computer in execution of a procedure included in an automated flow before the automated flow is executed.

The representative one of inventions disclosed in this application is outlined as follows. There is provided a computer system, comprising a management computer to be coupled to a management subject resource managed by the management computer, which includes at least one of a server apparatus, a storage apparatus or a network apparatus and a display computer coupled to the management computer. The management computer includes a memory storing at least one workflow program including a work procedure and having a dependency in an execution sequence, and a CPU configured to execute the at least one workflow program. The work procedure changes a configuration of the management subject resource, and acquires information from the management subject resource The CPU is configured to execute prior verification processing of verifying an operation environment of the management subject resource to operate the work procedure included in the at least one workflow program before execution of the at least one workflow program, and display an execution result of the prior verification processing on the display computer.

According to the exemplary embodiment of this invention, that a failure of the management computer in execution of a procedure included in an automated flow can be detected before the automated flow is executed. Other objects, configurations, and effects than those described above are made clear in the following description of embodiments.

BRIEF DESCRIPTION OF THE DRAWINGS

FIG. 3 is an explanatory diagram of the flow list table according to the first embodiment of this invention.

FIG. 4 is an explanatory diagram of the procedure list table according to the first embodiment of this invention.

FIG. 5 is an explanatory diagram of the prior verification list table according to the first embodiment of this invention.

FIG. 17 is an explanatory diagram of the prior verification result comparison screen according to the second embodiment of this invention.

FIG. 18 is an explanatory diagram of the flow dependency list screen according to a third embodiment of this invention.

DETAILED DESCRIPTION OF THE PREFERRED EMBODIMENTS

Figure 1:
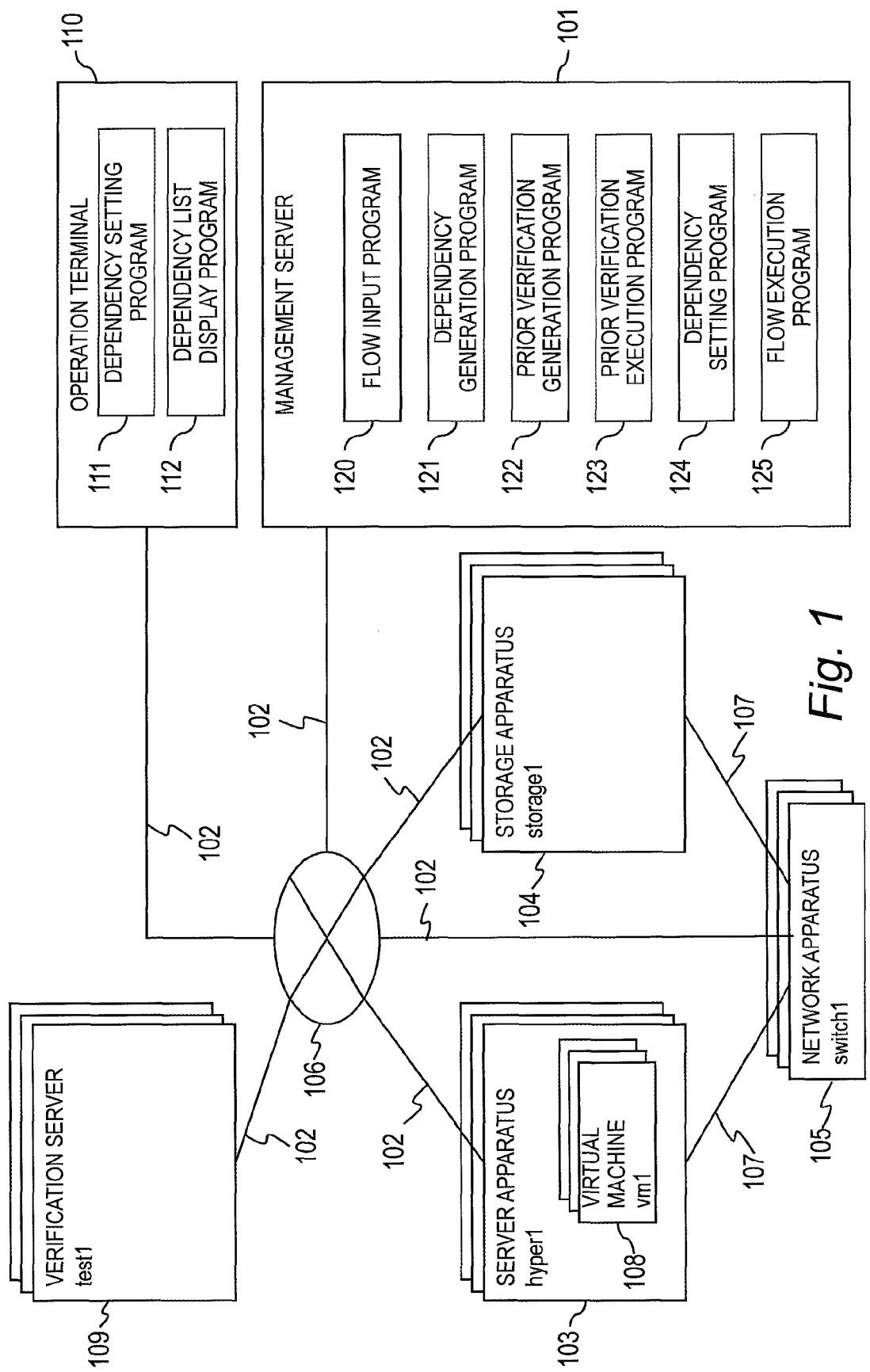
FIG. 1 is an explanatory diagram of a configuration of an information processing system according to the first embodiment of this invention.

Embodiments of this invention are described below referring to the accompanying drawings. In order to clarify the description, in the following description and the drawings, some omissions and simplification are made as needed. Further, the same reference numerals are given to the same elements throughout the drawings to avoid redundant descriptions as needed for clarification of the description.

In the following description, although pieces of information of this invention are described by using such an expression as "aaa table" in some cases, those pieces of information may be expressed in other forms than such data structures as a table, and the like. Therefore, "aaa table", and the like are sometimes referred to as "aaa information" in order to show that those pieces of information are independent of their data structures.

In addition, although such expressions as "identification information", "identifier", "name", "ID" are used in some cases in order to describe details of each piece of information, those expressions are interchangeable.

In the following description, although a description is given by using "program" as a subject in some cases, the program is executed by a processor to perform defined processing while using a memory and a communication port (communication control interface). Therefore, the description given by using "program" as a subject may also be interpreted as a description given by using "processor" as a subject. Moreover, processing disclosed while a program is described as a subject may be processing executed by a computer such as a management server and an information processing apparatus. Moreover, the program may be partially or entirely implemented by dedicated hardware.

Further, various programs included in a program may be installed on each of computers by means of computer-readable storage media.

First Embodiment

Now, a description is given of a first embodiment of this invention referring to FIGS. 1 to 15.

FIG. 1 is an explanatory diagram of a configuration of an information processing system according to the first embodiment of this invention.

The information processing system includes a management server (management computer) 101, an operation terminal (display computer) 110, server apparatus 103, storage apparatus 104, network apparatus 105, and verification servers 109.

The management server 101, the operation terminal 110, the server apparatus 103, the storage apparatus 104, the network apparatus 105, and the verification servers 109 are coupled via a link 102 to a network for management 106. The server apparatus 103 and the storage apparatus 104 are coupled via a link 107 to the network apparatus 105, thereby constituting a network for business task. The link 102 and the link 107 are in a wireless or wired coupling type, and may include at least one sub-network, and virtual private network (VPN). The management server 101, the operation terminal 110, the server apparatus 103, the storage apparatus 104, the network apparatus 105, and the verification servers 109 may be coupled to the network for management 106 or the network apparatus 105 via different methods.

Virtual machines 108 are operating on the server apparatus 103, and are coupled wirelessly or wiredly to at least one of the network for management 106 or the network apparatus 105.

The server apparatus 103 and the storage apparatus 104 may be directly coupled to each other by means of a wired or wireless coupling method without interposition of the network apparatus 105.

FIG. 1 illustrates a case where a plurality of server apparatus 103, a plurality of storage apparatus 104, a plurality of network apparatus 105, a plurality of virtual machines 108, and a plurality of verification servers 109 exist, but the number of each type of apparatus may be one. Moreover, the server apparatus 103, the storage apparatus 104, and the network apparatus 105 are generally referred to as management subject resources. The management subject resource only needs to have at least one of the server apparatus 103, the storage apparatus 104, or the network apparatus 105.

Moreover, the management server 101, the operation terminal 110, the server apparatus 103, the storage apparatus 104, the network apparatus 105, and the verification server 109 may be realized by virtual machines. Moreover, at least two functions out of functions of the management server 101, the operation terminal 110, the server apparatus 103, the storage apparatus 104, the network apparatus 105, and the verification server 109 may be realized by the same enclosure or the same virtual machine.

The network apparatus 105 may be coupled to another network apparatus 105 by means of a wired or wireless coupling method. Moreover, a network provided by the network apparatus 105 may be the same as the network for management 106. Moreover, the link 102 and the link 107 may be the same.

In FIG. 1, "hyper1" is exemplified as a host name of one server apparatus 103; "vm1", as a host name of one virtual machine 108; "storage1", as a host name of one storage apparatus 104; "switch1", as a host name of one network apparatus 105; and "test1", as a host name of one verification server 109. It should be noted that host names of these apparatus may be different from the host names exemplified in FIG. 1.

The management server 101 is a computer for managing the management subject resources, and includes a flow input program 120, a dependency generation program 121, a prior verification generation program 122, a prior verification execution program 123, a dependency setting program 124, and a flow execution program 125. A detailed description is given of the management server 101 referring to FIG. 2.

The operation terminal 110 includes an output device, which is not shown, for displaying a screen based on a display instruction from the management server 101, and includes a dependency setting program 111 and a dependency list display program 112. It should be noted that the operation terminal 110 may be implemented in the same enclosure as that of the management server 101.

The dependency list display program 112 displays a screen including dependencies between workflow programs generated by the dependency generation program 124. The dependency setting program 111 receives an addition or a deletion of a dependency between workflow programs via a screen displayed by the dependency list display program 112.

The storage apparatus 104 includes a storage area. The storage apparatus 104 writes data in the storage area based on a write instruction from the server apparatus 103, and reads data stored in the storage area based on a read instruction from the server apparatus 103.

The server apparatus 103 transmits the write instruction and the read instruction to the storage apparatus 104, and sets a virtual storage area in the storage area.

The network apparatus 105 couples the server apparatus 103 and the storage apparatus 104 to each other, and relays communication between the server apparatus 103 and the storage apparatus 104.

The verification server 109 is a computer for executing prior verification processing by executing a verification script generated by the management server 101. The prior verification processing is processing of verifying an operation environment and the like of a certain workflow program before the workflow program is executed. It should be noted that the verification server 109 is provided due to such a situation that the storage apparatus 104 cannot execute the prior verification processing. Therefore, if the management subject resource does not include the storage apparatus 104, the information processing system may not include the verification servers 109, and the server apparatus 103 may execute the prior verification processing.

Figure 2:
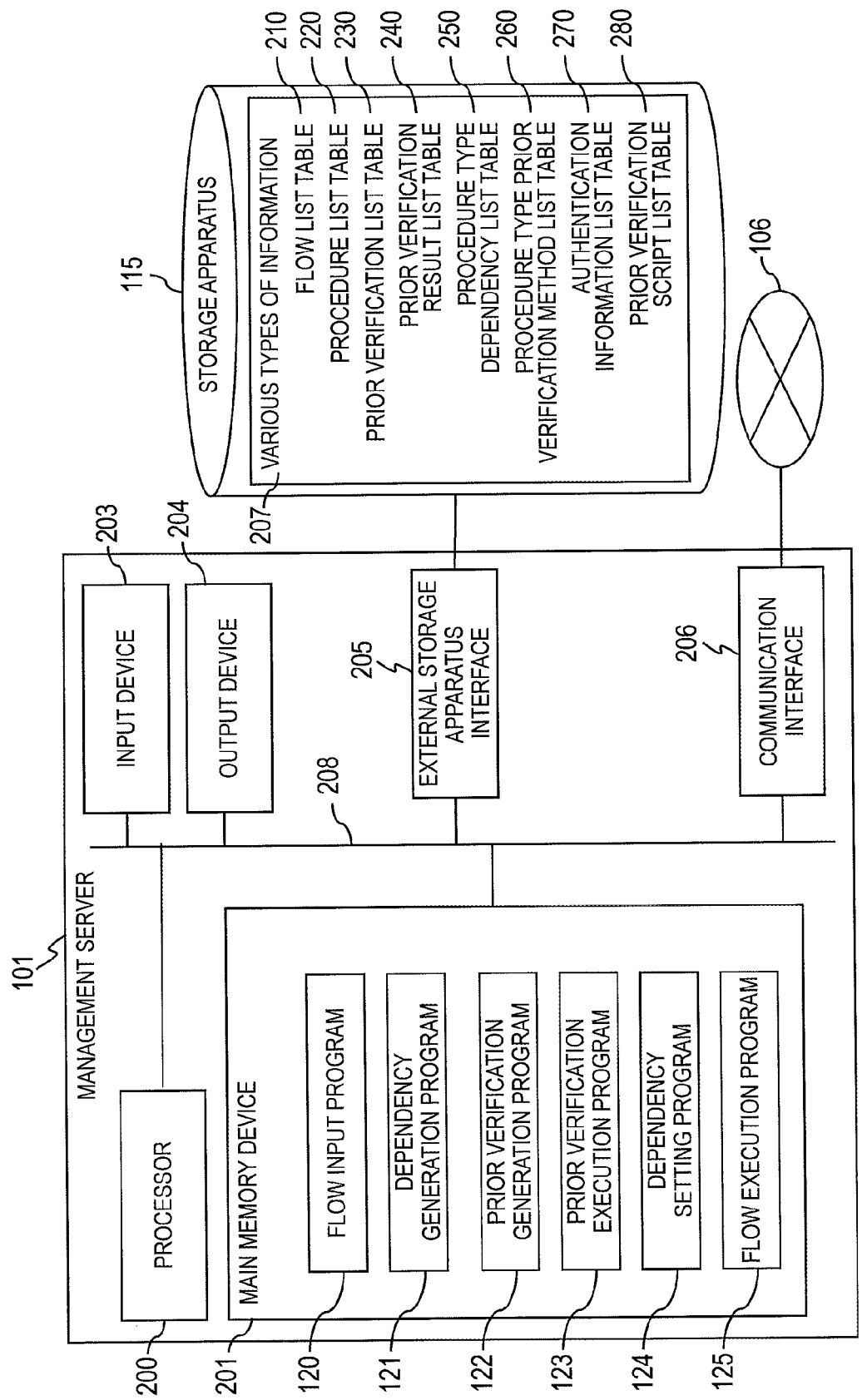
FIG. 2 is a block diagram illustrating a hardware configuration of the management server according to the first embodiment of this invention.

FIG. 2 is a block diagram illustrating a hardware configuration of the management server 101 according to the first embodiment of this invention.

The management server 101 includes a processor 200, a main memory device 201, an input device 203, an output device 204, an external storage apparatus interface 205, and a communication interface 206. These components are coupled via a bus 208 for communication. Moreover, the external storage apparatus interface 205 is coupled to the storage apparatus 115.

The processor 200 executes various programs stored in the main memory device 201, loads various types of information 207 stored in the storage apparatus 115 to the main memory device 201, and refers to the loaded various types of information 207.

The main memory device 201 stores the flow input program 120, the dependency generation program 121, the prior verification generation program 122, the prior verification execution program 123, the dependency setting program 124, and the flow execution program 125.

The flow input program 120 receives an input of the workflow program. The workflow program includes at least one of a work procedure of changing a configuration of the management subject resource, or a work procedure of acquiring information from the management subject resource, and has a dependency on another workflow program in an execution sequence. Referring to FIG. 3, a detailed description is given of the workflow program.

Figure 14:
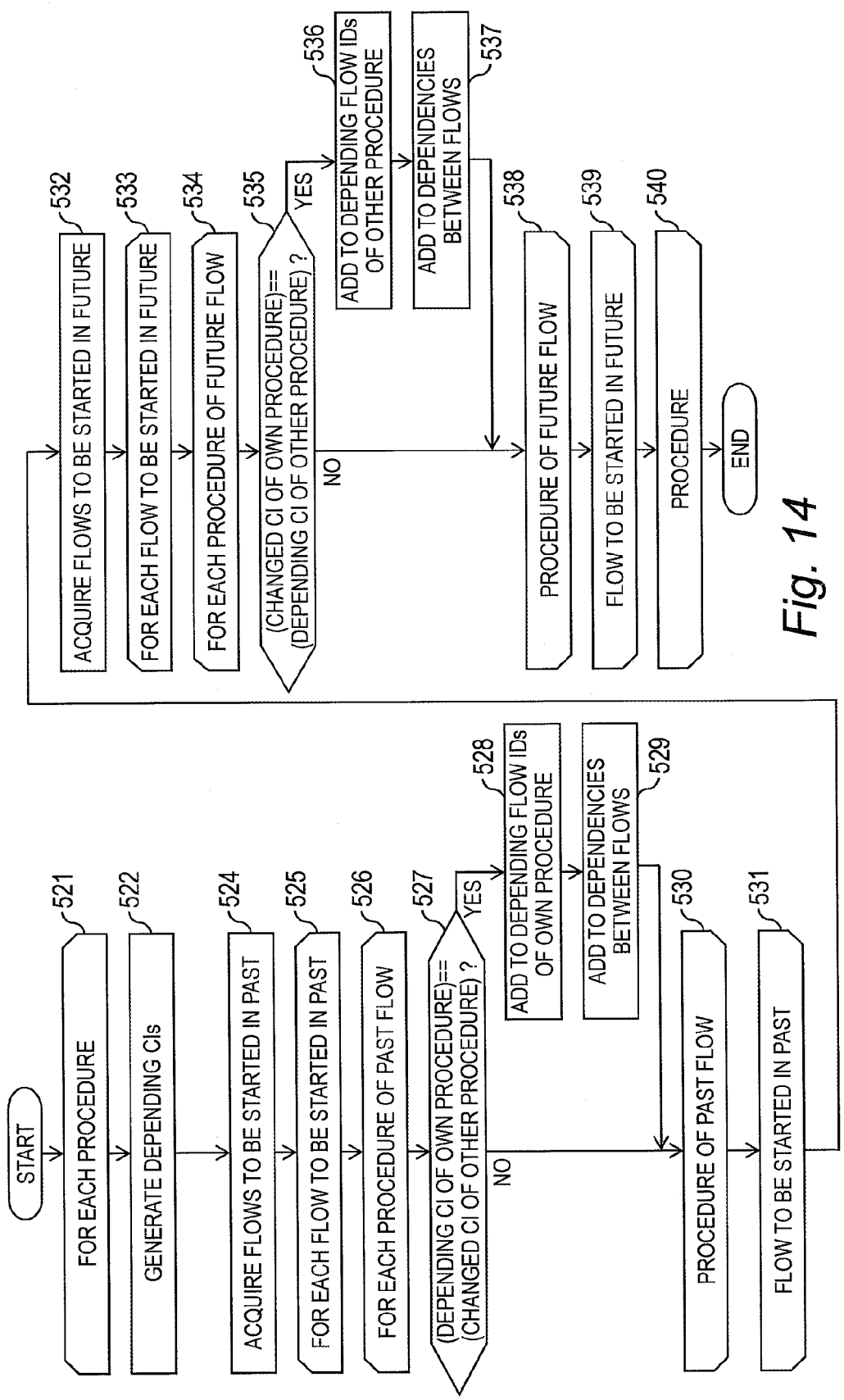
FIG. 14 is a flowchart of the dependency generation processing according to the first embodiment of this invention.

The dependency generation program 121 generates a dependency between workflow programs. If a first workflow program and a second workflow program exist, and a configuration of the management subject resource required for executing the first workflow program is established by execution of the second workflow program, a dependency between the first workflow program and the second workflow program exists, the first workflow program depends on the second workflow program, and the second workflow program is depended on by the first workflow program. Referring to FIG. 14, a detailed description is given of processing by the dependency generation program 121.

The prior verification generation program 122 generates the verification script for executing the prior verification processing corresponding to the work procedure included in the workflow program. The prior verification processing is processing of verifying, before a workflow program is executed, an operation environment of the management subject resources for the work procedure included in the workflow program to operate.

Figure 13:
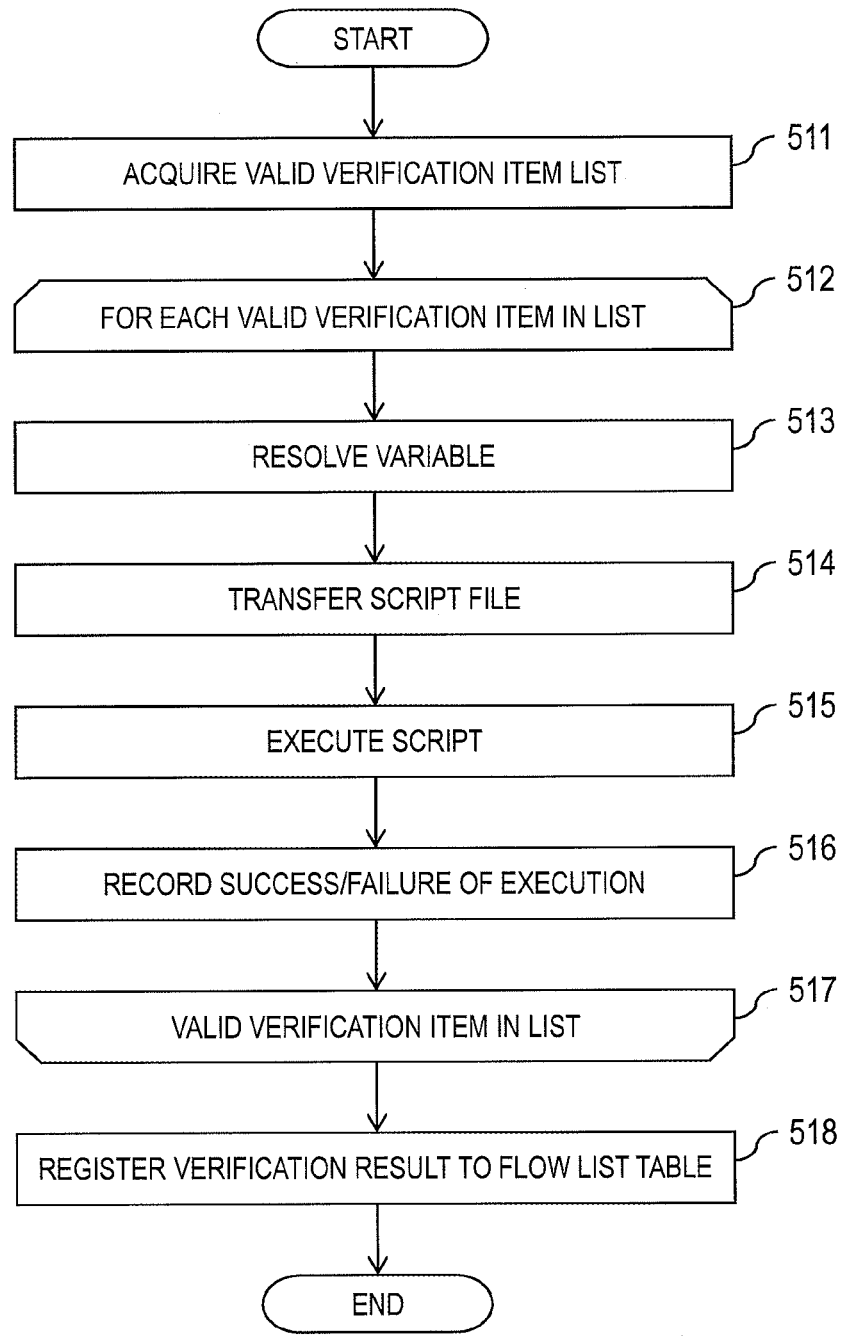
FIG. 13 is a flowchart of the prior verification execution processing according to the first embodiment of this invention.

The prior verification execution program 123 executes the verification script generated by the prior verification generation program 122. Referring to FIG. 13, a detailed description is given of processing by the prior verification execution program 123.

When an administrator inputs an addition instruction or a deletion instruction intended for a dependency between workflow programs, the dependency setting program 124 sets a dependency between the workflow programs based on the input addition instruction or deletion instruction.

Figure 15:
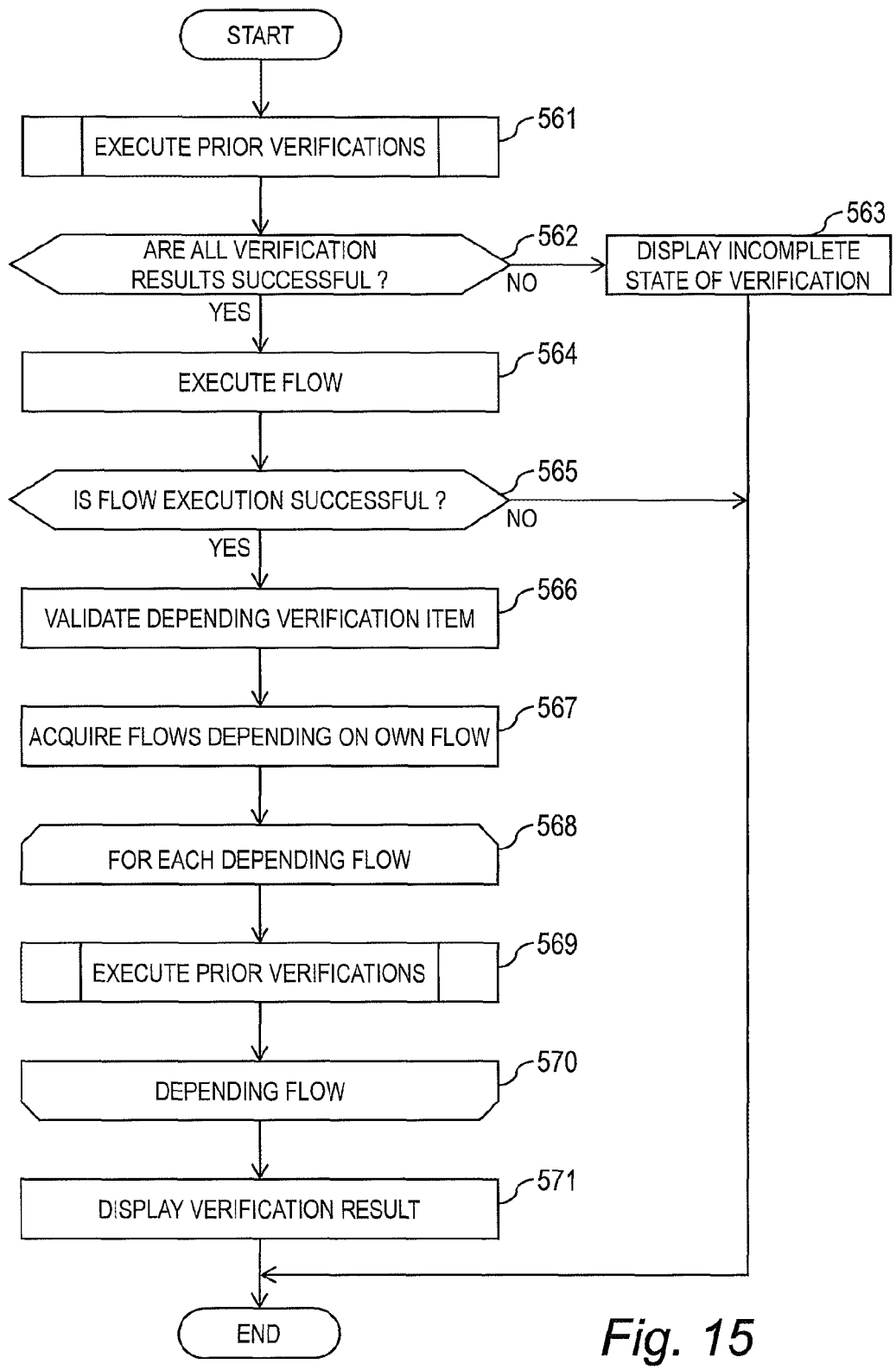
FIG. 15 is a flowchart of the flow execution processing according to the first embodiment of this invention.

The flow execution program 125 executes the workflow program. Referring to FIG. 15, a detailed description is given of processing by the flow execution program 125.

It should be noted that the processing by the various programs 120 to 125 stored in the main memory device 201 may be realized by hardware in place of the processor 200 executing the various programs 120 to 125.

As examples of the input device 203, a keyboard and a pointer device are conceivable, but the input device may be replaced with other devices. Moreover, a display or the like is conceivable as an example of the output device 204, but the output device 204 may be a device other than the display. Moreover, a serial interface or an Ethernet interface may be used as an alternative to the input device 203 and the output device 204 (hereinafter collectively referred to as input/output device), and input and output on the input device may be substituted by coupling the display computer including a display, a keyboard, or a pointer device to the interface, transmitting information for output (information for display) to the display computer, and receiving information for input from the display computer, thereby displaying the information for output and receiving inputs by the display computer.

In the following, a set of at least one computer for managing the information processing system, and displaying the information for display according to this invention may be referred to as a management system. If the management server 101 displays the information for display, the management server 101 is a management system, and a combination of the management server 101 and the display computer also constitute the management system. Moreover, the same processing as the management computer may be realized by a plurality of computers for increasing a speed and reliability of management processing, and the plurality of computers (including the display computer if the display is carried out by the display computer) constitute the management system in this case.

The communication interface 206 is coupled to the network for management 106. The communication interface 206 and the external storage apparatus interface 205 may be the same interface.

Then, the storage apparatus 115 stores a flow list table 210, a procedure list table 220, a prior verification list table 230, a prior verification result list table 240, a procedure type dependency list table 250, a procedure type prior verification method list table 260, an authentication information list table 270, and a prior verification script list table 280 as the various types of information 207.

Information on workflow programs to be executed by the management server 101 is registered to the flow list table 210. Referring to FIG. 3, a detailed description is given of the flow list table 210.

Information on the work procedures included in each workflow program is registered to the procedure list table 220. Referring to FIG. 4, a detailed description is given of the procedure list table 220.

Information on the prior verification processing for the work procedure included in the workflow program is registered to the prior verification list table 230. Referring to FIG. 5, a detailed description is given of the prior verification list table 230.

Figure 6:
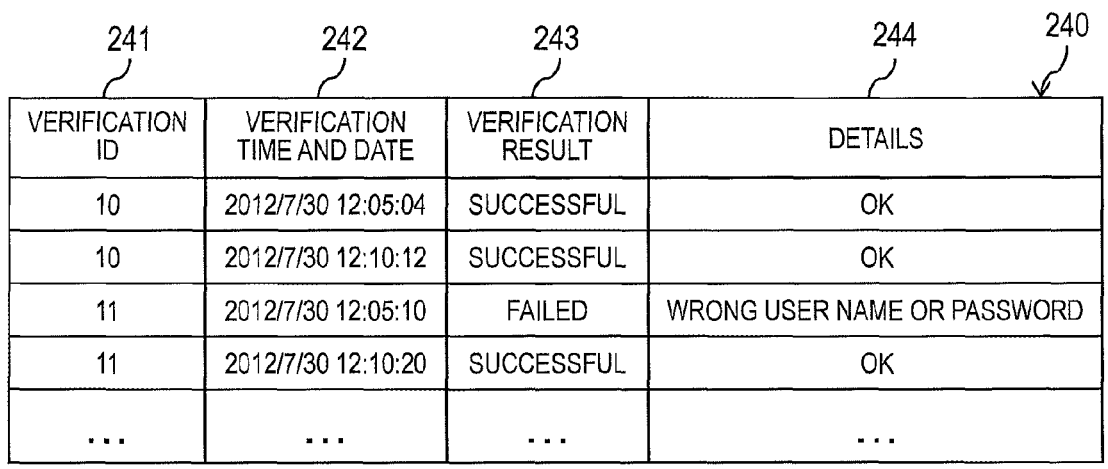
FIG. 6 is an explanatory diagram of the prior verification result list table according to the first embodiment of this invention.

Prior verification results are registered to the prior verification result list table 240. Referring to FIG. 6, a detailed description is given of the prior verification result list table 240.

Figure 7:
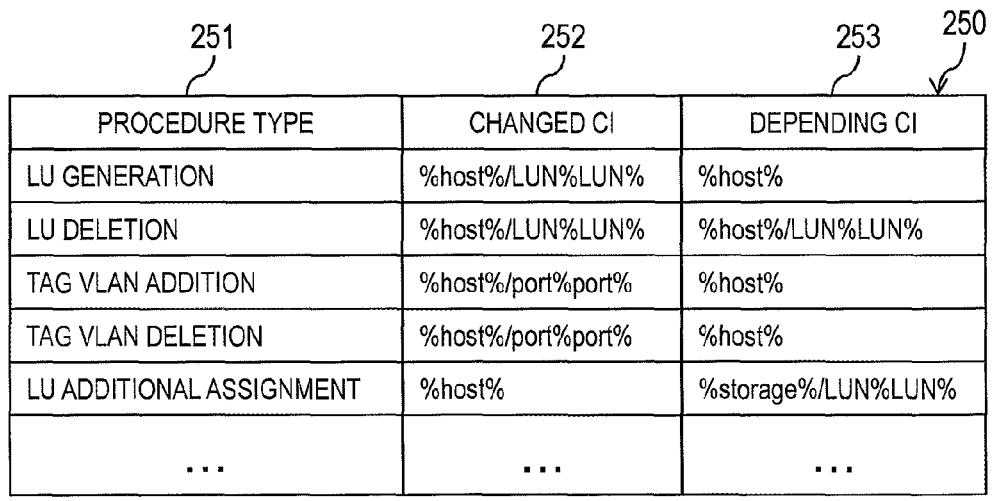
FIG. 7 is an explanatory diagram of the procedure type dependency list table according to the first embodiment of this invention.

Information referred to when a dependency between workflow programs to be newly added is generated is registered to the procedure type dependency list table 250. Referring to FIG. 7, a detailed description is given of the procedure type dependency list table 250.

Figure 8:
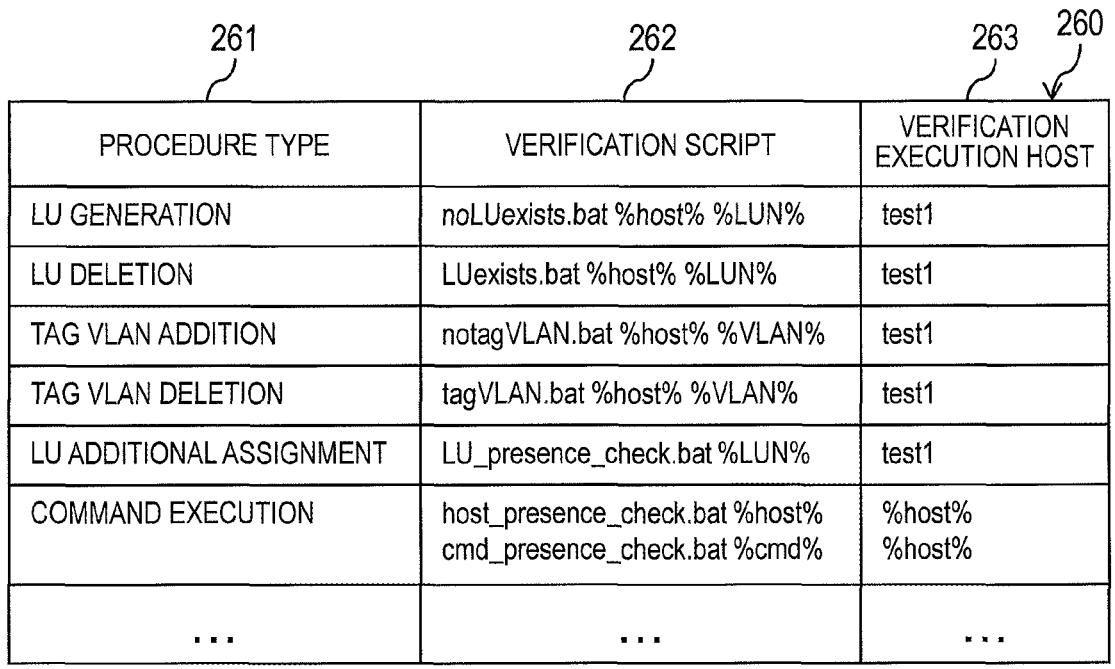
FIG. 8 is an explanatory diagram of the procedure type prior verification method list table according to the first embodiment of this invention.

Information referred to when a verification script for executing prior verification processing corresponding to a work procedure included in a workflow program to be newly added is generated is registered to the procedure type prior verification method list table 260. Referring to FIG. 8, a detailed description is given of the procedure type prior verification method list table 260.

Authentication information required when a work procedure included in a workflow program and a verification script are respectively executed by the verification server 109 and the management subject resource is registered to the authentication information list table 270. If agents for executing the procedure and the verification script operate on the verification server 109 and the management subject resource, the authentication information list table 270 is not necessary.

Verification scripts generated by the prior verification generation program 122 are registered to the prior verification script list table 280.

FIG. 3 is an explanatory diagram of the flow list table 210 according to the first embodiment of this invention.

A name, planned execution time and date, a dependency, and the like of each workflow program including a series of configuration change procedures for a management subject resource and an information acquisition procedure from the management subject resource are registered to the flow list table 210.

The flow list table 210 has a tabular form, and includes at least one row. The row included in the flow list table 210 has seven columns.

The flow list table 210 includes flow IDs 211, flow names 212, planned execution times and dates 213, depending flow IDs 214, depended flow IDs 215, execution results 216, and verification results 217.

Identification information for a workflow program is registered to the flow ID 211. A name of the workflow program is registered to the flow name 212. Planned time and date of starting the execution of the workflow program is registered to the planned execution time and date 213.

Identification information for a workflow program which establishes a configuration of the management subject resource required for the execution of the workflow program of the subject record is registered to the depending flow ID 214. In other words, the identification information for a workflow program on which the workflow program in the subject record depends is registered to the depending flow ID 214.

Identification information for a workflow program which establishes a configuration of the management subject resource that can be executed by the execution of the workflow program of the subject record is registered to the depended flow ID 215. In other words, the identification information for a workflow program which depends on the workflow program in the subject record is registered to the depended flow ID 215.

An execution result of the workflow program is registered to the execution result 216. Specifically, information on successful execution of the workflow program (successful), information on failed execution of the workflow program (failed), or information on a situation where the workflow program has not been executed yet (unexecuted) is registered to the execution result 216.

A result of the prior verification processing of the workflow program is registered to the verification result 217. Specifically, information on a situation where the prior verification processing for all work procedures included in the workflow program succeeded in the verification (verified), information on a situation where the prior verification processing for at least one work procedure included in the workflow program failed in the verification (verification failed), or information on a situation where the prior verification processing for at least one work procedure included in the workflow program has not been executed yet (partially unverified) is registered to the verification result 217. It should be noted that information other than these pieces of information may be registered to the verification result 217.

It should be noted that each of the rows of the flow list table 210 may include a column, which is not shown, other than the flow ID 211, the flow name 212, the planned execution time and date 213, the depending flow ID 214, the depended flow ID 215, the execution result 216, and the verification result 217, and may not include at least one of the columns.

Moreover, information manually input by the administrator or the like may be registered to the flow list table 210, or information may be registered to the flow list table 210 by using a certain tool or utility.

FIG. 4 is an explanatory diagram of the procedure list table 220 according to the first embodiment of this invention.

The procedure list table 220 registers work procedures included in a workflow program. The procedure list table 220 has a tabular form, and includes at least one row. The row included in the procedure list table 220 has nine columns.

The procedure list table 220 includes flow IDs 221, procedure numbers 222, procedure names 223, procedure types 224, operation subject host names 225, parameters 226, changed CIs 227, depending CIs 228, and depending flows 229.

Identification information for a workflow program including work procedures is registered to the flow ID 221. The procedure list table 220 and the flow list table 210 are linked to each other by the flow ID 221 included in the sequence list table 220 and the flow ID 211 included in the flow list table 210.

An execution sequence of the work procedure in the workflow program is registered to the procedure number 222. The procedure numbers 222 illustrated in FIG. 4 illustrate only a case where the work procedures in the workflow program are sequentially executed, but the work procedure may be executed to branch and merge, and a plurality of work procedures may be executed in parallel.

A name of the work procedure is registered to the procedure name 223. A type of an operation method of the work procedure is registered to the procedure type 224. Identification information for a management subject resource whose configuration is changed by the work procedure, or a management subject resource whose information is acquired by the work procedure is registered to the operation subject host name 225. The identification information is an IP address, a MAC address, a world wide network (WWN), or a universally unique identifier (UUID).

Parameters for the type registered to the procedure type 224 are registered to the parameter 226. For example, "cmd=" in the parameter 226 of a record having command execution in the procedure type 224 represents an executable file name, and "args=" represents command line parameters provided for the executable file.

Identification information for each of configurations (Configuration Items) of the management subject resource changed by the execution of the work procedure registered to the procedure name 223 is registered to the changed CI 227. The identification information for the configuration of the management subject resource registered to the changed CI 227 is represented in a tree form such as "host name", "host name/configuration element", or "host name/configuration element/sub-configuration element". Identification information for the configuration of the management subject resource in a form different from the tree form may be registered to the changed CI 227.

Identification information for a configuration (Configuration Item) of the management subject resource required to be generated or set for the execution of the work procedure registered to the procedure name 223 is registered to the depending CI 228. A representation form of the identification information for the configuration of the management subject resource registered to the depending CI 228 is the same as the changed CI 227.

Identification information for a workflow program execution of which needs to be successfully finished before the execution of the work procedure registered to the procedure name 223 starts is registered to the depending flow 229.

It should be noted that each of the rows of the procedure list table 220 may include a column, which is not shown, other than the flow ID 221, the procedure number 222, the procedure name 223, the procedure type 224, the operation subject host name 225, the parameter 226, the changed CI 227, the depending CI 228, and the depending flow 229, and may not include at least one of the columns.

Moreover, information manually input by the administrator or the like may be registered to the procedure list table 220, or information may be registered to the procedure list table 220 by using a certain tool or utility.

FIG. 5 is an explanatory diagram of the prior verification list table 230 according to the first embodiment of this invention.

Correspondences each between a work procedure included in a workflow program and prior verification processing are registered to the prior verification list table 230. The prior verification processing is processing of controlling, by the management server 101, a predetermined script or the like to be executed on a predetermined host, and acquiring an execution result. It should be noted that the management server 101 may control an executable file, in place of the script, to be executed on the predetermined host, or may control an archive to be decompressed on the predetermined host, thereby acquiring the executable file or the script, and executing the executable file or the script.

The prior verification list table 230 has a tabular form, and includes at least one row. The row included in the prior verification list table 230 has eight columns.

The prior verification list table 230 includes verification IDs 231, flow IDs 232, prior verification names 233, corresponding procedures 234, verification scripts 235, verification execution hosts 236, depending flow IDs 237, and valid/invalid 238.

Identification information for prior verification processing is registered to the verification ID 231. Identification information for a workflow program including a work procedure corresponding to the prior verification processing is registered to the flow ID 232. The prior verification list table 230, the flow list table 210, and the procedure list table are linked to each other by means of the flow ID 232 in the prior verification list table 230, the flow ID 211 of the flow list table 210, and the flow ID 221 of the procedure list table.

A name of prior verification processing is registered to the prior verification name 233. Identification information for a work procedure corresponding to the prior verification processing is registered to the corresponding procedure 224. The corresponding procedure 234 is associated with the procedure number in the procedure list table 220.

The identification information for a workflow program registered to the flow ID 232 and the identification information for a work procedure registered to the corresponding procedure 234 enable identification of which work procedure of which workflow program a certain prior verification processing corresponds.

A script file describing the prior verification processing and a command line provided by the management server 101 for a host which executes the script file are registered to the verification script 235. A portion between two "%"s of the verification script 235 is replaced by a string registered to the operation subject host name 225 and the parameter 226 of a record corresponding to the work procedure registered to the corresponding procedure 234 of the prior verification list table 230 out of the records registered to the procedure list table 220, and the script is executed. For example, "% host %" registered to the verification script 235 of a record having "3" in the verification ID 231 of the prior verification list table 230 is converted to "storage1" registered to the operation subject host 225 of a record having "1" in the flow ID 221, and having "1" in the procedure number 222 of the procedure list table 220. Moreover, "% LUN %" registered to the verification script 235 of the record in the prior verification list table 230 is converted into "1" based on "LUN=1" registered to the parameter 226 of the record having "1" in the flow ID 221, and having "1" in the procedure number 222 of the procedure list table 220.

A script file is exemplified as the verification script 235 in the prior verification list table 230 illustrated in FIG. 5, but the verification script 235 may be an executable file or an archive file (ZIP and the like).

A host name of the server apparatus 103, the storage apparatus 104, the network apparatus 105, the virtual machine 108, and the verification server 109 for actually executing the script for the prior verification processing is registered to the verification execution host 236.

Identification information for a workflow program execution of which needs to be finished before the execution of the prior verification processing is registered to the depending flow ID 237. For example, "LU presence check" processing having "12" in the verification ID 231 in the prior verification list table 230 cannot check presence of an LU unless the LU has been set in advance in "storage setting for order placement system" having "1" in the flow ID. Therefore, the prior verification processing "LU presence check" depends on "storage setting for order placement system". It should be noted that not only the identification information for the workflow program but also the procedure number of the workflow program may be registered to the depending flow ID 237.

Information of whether the prior verification processing is to be executed or not is registered to the valid/invalid 238. If prior verification processing has a depending workflow program, when the execution of the depending workflow program has been completed, "valid" representing that the prior verification processing is to be executed is registered to the valid/invalid 238 of the prior verification processing, and when the execution of the depending workflow program has not been completed, "invalid" representing that the prior verification processing is not to be executed is registered.

Moreover, "valid" is registered to the valid/invalid 238 of the prior verification processing not having a depending workflow program.

Prior verification processing of checking absence/presence of a management subject resource (such as "storage apparatus presence check", "network apparatus presence check", and "host presence check"), prior verification processing of checking availability of coupling to a management subject resource (such as "storage apparatus login", "network switch login check", and "host login check"), prior verification processing of checking absence/presence of an executable file (such as "executable file presence check"), prior verification processing of checking availability of execution of an execution command, and the like are registered to the prior verification list table 230 illustrated in FIG. 5.

It should be noted that each of the rows of the prior verification list table 230 may include a column, which is not shown, other than the verification ID 231, the flow ID 232, the prior verification name 233, the corresponding procedure 234, the verification script 235, the verification execution host 236, the depending flow ID 237, and the valid/invalid 238, and may not include at least one of the columns.

Moreover, information manually input by the administrator or the like may be registered to the prior verification list table 230, or information may be registered to the prior verification list table 230 by using a certain tool or utility.

FIG. 6 is an explanatory diagram of the prior verification result list table 240 according to the first embodiment of this invention.

The prior verification result list table 240 registers results of the prior verification processing. The prior verification result list table 240 has a tabular form, and includes at least one row. The row included in the prior verification result list table 240 has four columns.

It should be noted that prior verification processing executed for a plurality of times at different time points exists, and a plurality of execution results of the same prior verification processing may be registered to the prior verification result list table 240.

The prior verification result list table 240 includes verification IDs 241, verification times and dates 242, verification results 243, and details 244.

Identification information for executed prior verification processing is registered to the verification ID 241. The prior verification result list table 240 and the prior verification list table 230 are linked to each other by the verification ID 241 of the prior verification result list table 240 and the verification ID 231 of the prior verification list table 230.

At least one of a time and date when the execution of prior verification processing is started, or a time and date when the execution of the prior verification processing is finished is registered to the verification time and date 242. An execution result of the prior verification processing is registered to the verification result 243. The case where successful or failed is registered to the verification result 243 is exemplified in FIG. 6, but information other than successful and failed may be registered. As the information other than successful failed, partially failed representing that the prior verification processing partially fails, a timeout, an end code of a script, and the like exist.

A string representing an execution result of the prior verification processing is registered to the details 244. For example, a standard output, a standard error output, and a log file output are registered to the details 244 when a script representing the prior verification processing is executed.

It should be noted that each of the rows of the prior verification result list table 240 may include a column, which is not shown, other than the verification ID 241, the verification time and date 242, the verification result 243, and the details 244, and may not include at least one of the columns.

Moreover, information manually input by the administrator or the like may be registered to the prior verification result list table 240, or information may be registered to the prior verification result list table 240 by using a certain tool or utility.

FIG. 7 is an explanatory diagram of the procedure type dependency list table 250 according to the first embodiment of this invention.

The procedure type dependency list table 250 is a table referred to by the management server 101 to generate the changed CI 227 and the depending CI 228 of the procedure list table 220 and the depending flow ID 237 of the prior verification list table 230 when a workflow program is added. The procedure type dependency list table 250 has a tabular form, and includes at least one row. The row included in the procedure type dependency list table 250 has three columns.

The procedure type dependency list table 250 includes procedure types 251, changed CIs 252, and depending CIs 253.

A type of a work procedure is registered to the procedure type 251. The procedure type dependency list table 250 is linked to the procedure list table 220 by the procedure type 251 of the procedure type dependency list table 250 and the procedure type 224 of the procedure list table 220.

A format of identification information for a configuration of a management subject resource to be changed by the execution of a work procedure of the type registered to the procedure type 251 is registered to the changed CI 252. Identification information for a configuration of a management subject resource required for the execution of the work procedure of the type registered to the procedure type 251 is registered to the depending CI 253.

When a new workflow program is added, the management server 101 identifies a type corresponding to a work procedure included in the workflow program, refers to the procedure type dependency list table 250, and acquires the formats registered to the changed CI 252 and the depending CI 253 of the identified type. Then, the management server 101 generates information to be registered to the changed CI 227 and the depending CI 228 based on the acquired formats and the format provided for the work procedure. Specifically, parts enclosed by two "%"s of the changed CI 252 and the depending CI 253 are replaced by the strings registered respectively to the operation subject host name 225 and the parameter 226 of a record of the procedure list table 220 corresponding to the type registered to the procedure type 251, and are registered to the changed CI 227 and the depending CI 228 of the record. The replacement method is the same as the verification script 235 of the prior verification list table 230.

It should be noted that each of the rows of the procedure type dependency list table 250 may include a column, which is not shown, other than the procedure type 251, the changed CI 252, and the depending CI 253, and may not include at least one of the columns.

Moreover, information manually input by the administrator or the like may be registered to the procedure type dependency list table 250, or information may be registered to the procedure type dependency list table 250 by using a certain tool or utility.

FIG. 8 is an explanatory diagram of the procedure type prior verification method list table 260 according to the first embodiment of this invention.

The procedure type prior verification method list table 260 is a table referred to by the management server 101 when a workflow program is added to generate a verification script included in the workflow program to be added. The procedure type prior verification method list table 260 has a tabular form, and includes at least one row. The row included in the procedure type prior verification method list table 260 has three columns.

The procedure type prior verification method list table 260 includes procedure types 261, verification scripts 262, and verification execution hosts 263.

A type of a work procedure is registered to the procedure type 261. The procedure type prior verification method list table 260 is linked to the procedure list table 220 by the procedure type 261 of the procedure type prior verification method list table 260 and the procedure type 224 of the procedure list table 220.

A format of a verification script corresponding to the type of the work procedure included in the work program to be added is registered to the verification script 262. Identification information for a host for executing the verification script is registered to the verification execution host 263.

When a workflow program is added, the management server 101 identifies a type corresponding to a work procedure included in the workflow program to be added, refers to the procedure type prior verification method list table 260, acquires a format registered to the verification script 262 of the identified type, and acquires the identification information for a host registered to the verification execution host 263. Then, the management server 101 identifies a record corresponding to the work procedure included in the workflow program to be added in the prior verification list table 230, registers the acquired format to the verification script 235 of the record, and registers the acquired identification information for the host to the verification execution host 236 of the record.

A plurality of formats may be registered to the verification script 262, and the identification information for a plurality of hosts may be registered to the verification execution host 263.

It should be noted that each of the rows of the procedure type prior verification method list table 260 may include a column, which is not shown, other than the procedure type 261, the verification script 262, and the verification execution host 263, and may not include at least one of the columns.

Moreover, information manually input by the administrator or the like may be registered to the procedure type prior verification method list table 260, or information may be registered to the procedure type prior verification method list table 260 by using a certain tool or utility.

Figure 9:
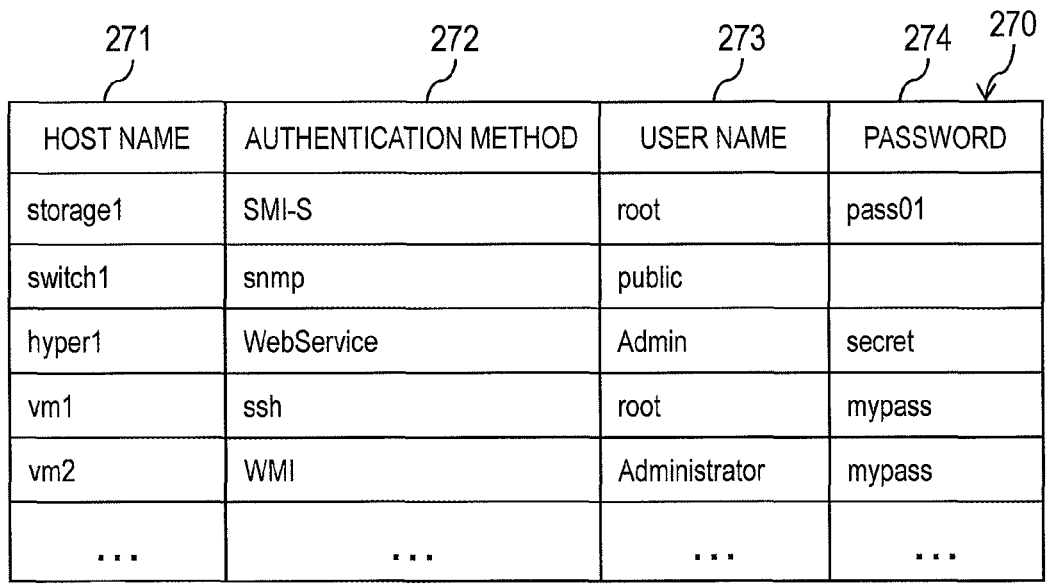
FIG. 9 is an explanatory diagram of the authentication information list table according to the first embodiment of this invention.

FIG. 9 is an explanatory diagram of the authentication information list table 270 according to the first embodiment of this invention.

Authentication information (credential information) required when a work procedure included in a workflow program and prior verification processing are executed by the server apparatus 103, the storage apparatus 104, the network apparatus 105, the virtual machine 108, and the verification server 109 is registered to the authentication information list table 270. The authentication information list table 270 has a tabular form, and includes at least one row. The row included in the authentication information list table 270 has four columns.

The authentication information list table 270 includes host names 271, authentication methods 272, user names 273, and passwords 274.

A host name of the server apparatus 103, the storage apparatus 104, the network apparatus 105, or the verification server 109 is registered to the host name 271. A protocol used when the management server 101 couples via a network to an apparatus identified by the host name registered to the host name 271 is registered to the authentication method 272.

Authentication information used when the management server 101 couples via a network to the apparatus identified by the host name registered to the host name 271 is registered to the user name 273 and the password 274.

It should be noted that each of the rows of the authentication information list table 270 may include a column, which is not shown, other than the host name 271, the authentication method 272, the user name 273, and the password 274, and may not include at least one of the columns.

Moreover, information manually input by the administrator or the like may be registered to the authentication information list table 270, or information may be registered to the authentication information list table 270 by using a certain tool or utility.

Figure 10:
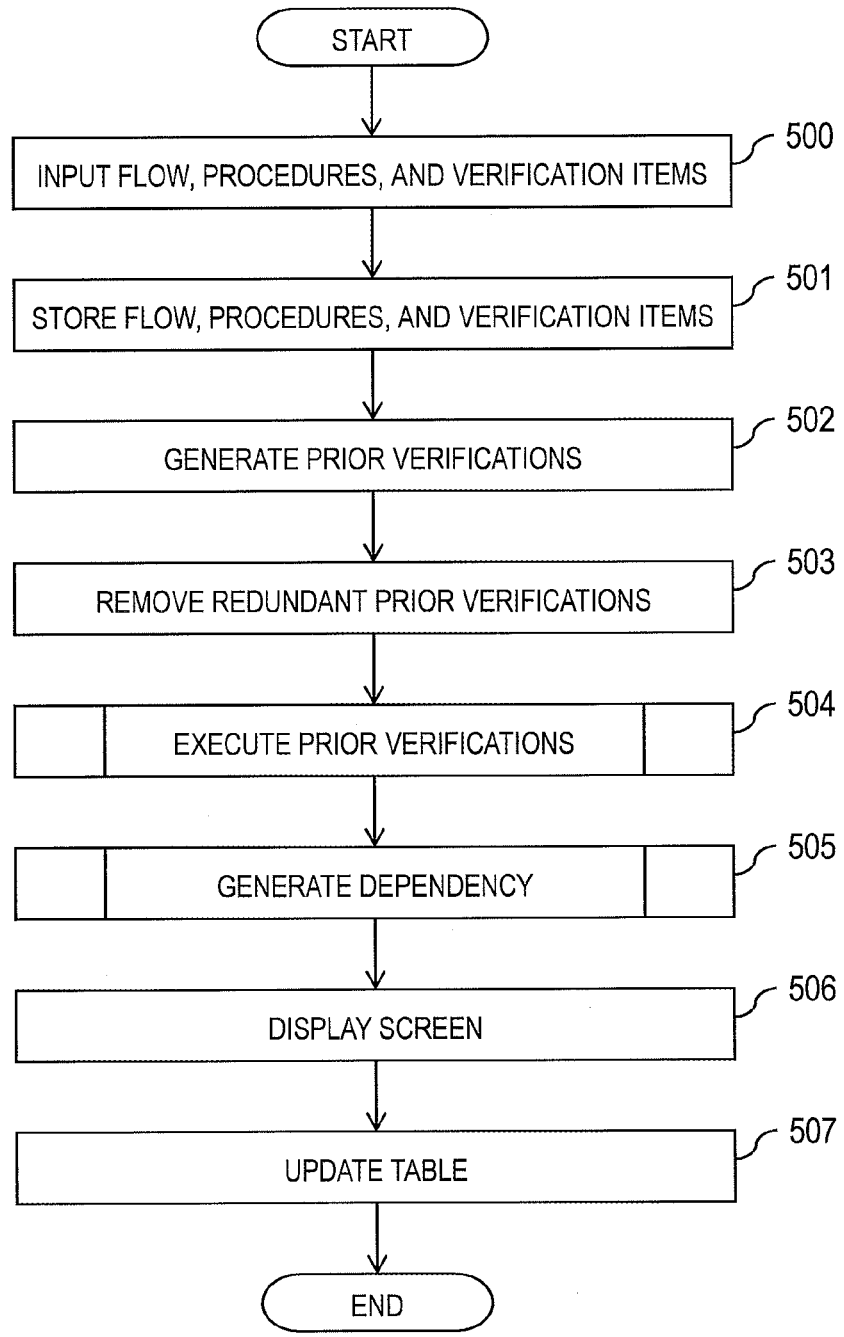
FIG. 10 is a flowchart of workflow program addition processing according to the first embodiment of this invention.

FIG. 10 is a flowchart of workflow program addition processing according to the first embodiment of this invention.

The workflow program addition processing is realized by the processor 200 of the management server 101 executing the flow input program 120, the dependency generation program 121, the prior verification generation program 122, the prior verification execution program 123, and the dependency setting program 124, and a processor (not shown) of the operation terminal 110 executing the dependency setting program 111 and the dependency list display program 112 when a workflow program is added. The workflow program addition processing may include processing other than the processing illustrated in FIG. 10, or may not always need to include all the processing illustrated in FIG. 10.

First, the processor 200 executes the flow input program 120, thereby receiving inputs of a workflow program to be added and work procedures included in the workflow program (500). The processor 200 may receive an input of prior verification processing executed for the work procedure, but a description is given while assuming that prior verification processing is not input in FIG. 10.

Specifically, the processor 200 may receive information input by the administrator via a GUI for input of the workflow program or the like, or may receive an input of a structured file such as the XML via a command line interface (CLI).

Moreover, at least a name and execution time and date of the workflow program are input as the workflow program, but the depending flow ID and the depended flow ID may or may not be input. At least an execution sequence of the work procedures in the workflow program, work procedure names, types corresponding to the work procedures, operation subject host names, and parameters are input as the work procedures, and the changed CI, the depending CI, and the depending flow may or may not be input.

Then, the processor 200 executes the flow input program 120, thereby registering the input workflow program and work procedures to the flow list table 210 and the procedure list table 220 (501).

Specifically, the processor 200 adds a record to the flow list table 210. Then, the processor 200 registers the identification information to the flow ID 211 of the added record, registers the name of the input workflow program to the flow name 212, and registers the input planned execution time and date to the planned execution time and date 213. If the depending flow ID and the depended flow ID are input, the processor 200 registers the input depending flow ID to the depending flow ID 214, and registers the input depended flow ID to the depended flow ID 215.

Moreover, the processor 200 adds records as many as the number of the input work procedures to the procedure list table 220. Then, the processor 200 registers the identification information for the workflow program to the flow ID 221 of the added record, and registers an execution sequence of the input work procedure to the procedure number 222. Moreover, the processor 200 registers the input work procedure name to the procedure name 223 of the added record, registers the input type of the work procedure to the procedure type 224, registers the input host name to the operation subject host name 225, and registers the input parameters to the parameter 226. If the changed CI, the depending CI, and the depending flow are input, the processor 200 registers the input changed CI to the changed CI 227 of the added record, registers the input depending CI to the depending CI 228, and registers the input depending flow to the depending flow 229.

Moreover, if the prior verification processing is input, the processor 200 adds a new record to the prior verification list table 230, and registers the input prior verification processing.

Then, the processor 200 executes the prior verification generation program 122, refers to the procedure type prior verification method list table 260, and generates a verification script corresponding to each of the work procedures included in the input workflow program (502).

Specifically, the processor 200 identifies a record having a type of a work procedure registered to the procedure type 261 matching the type of the input work procedure from the records registered to the procedure type prior verification method list table 260. Then, the processor 200 acquires the format of the verification script registered to the verification script 262 included in the identified record, and the identification information for the host registered to the verification execution host 263. Then, the processor 200 replaces "% host %" of the acquired format of the verification script with the acquired identification information for the host. Then, the processor 200 registers the replaced format of the verification script to the verification script 235 of the added record of the prior verification list table 230, and registers the acquired identification information for the host to the verification execution host 236. Moreover, the processor 200 registers information representing "automatic generation" to the prior verification name 233 of the record of the prior verification list table 230, registers information ("-") representing that a depending flow does not exist to the depending flow ID 237, and registers "valid" to the valid/invalid 238.

Then, the processor 200 executes the prior verification generation program 122, thereby searching for pieces of prior verification processing overlapping each other between the work procedures in the same workflow program, and deletes the overlapping pieces of prior verification processing (503).

Specifically, the processor 200 identifies records having the same verification script registered to the verification script 235 and the same verification execution host registered to the verification execution host 236 out of records having the same identification information for a workflow program registered to the flow ID 232 in the prior verification list table 230. Then, the processor 200 deletes records other than a record that is first in the execution sequence registered to the corresponding procedure 234 out of the identified records.

For example, regarding records having a flow ID "4" in the prior verification list table 230 illustrated in FIG. 5, a record having the verification ID "8" and a record having the verification ID "9" overlap each other, and a record having the verification ID "10" and a record having the verification ID "11" overlap each other. Therefore, the execution sequence of the work procedure corresponding to the prior verification processing represented by the record having the verification ID "9" is after the execution sequence of the work procedure corresponding the prior verification processing represented by the record having the verification ID "8", and the record having the verification ID "9" is thus deleted. Regarding the record having the verification ID "10" and the record having the verification ID "11", the record having the verification ID "11" is deleted.

As a result, out of the pieces of prior verification processing corresponding to work procedures included in the same workflow program, overlapping pieces of prior verification processing are deleted leaving one piece of prior verification processing. Thus, execution of unnecessary pieces of prior verification processing is eliminated, and an execution time period of the prior verification processing of the processor 200 is reduced.

The processing in Step 503 may not be executed if it is determined that the reduction in the execution time period is not necessary.

Then, the processor 200 executes the prior verification execution program 123, and executes prior verification processing corresponding to each of the work procedures included in the workflow program to be added (504). It should be noted that, referring to FIG. 13, a detailed description is given of the prior verification execution processing.

Then, the processor 200 executes the dependency generation program 121, thereby executing dependency generation processing of generating dependencies by identifying workflow programs depended on by the workflow program to be added and workflow programs depending on the workflow program to be added (505). Referring to FIG. 14, a detailed description is given of the dependency generation processing. It should be noted that the processor 200 outputs the dependencies generated by the processing in Step 505 to the operation terminal 110.

Figure 11:
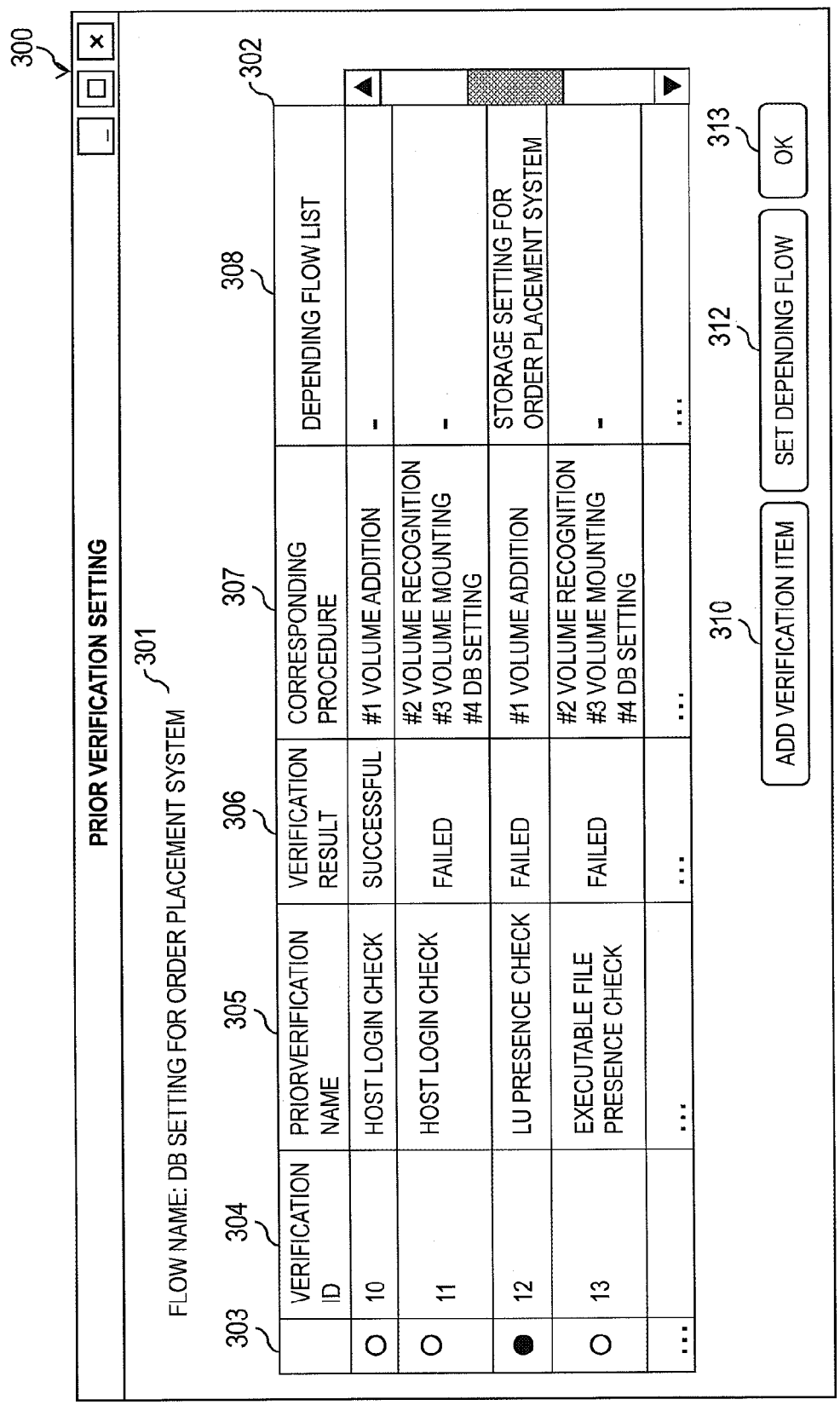
FIG. 11 is an explanatory diagram of the prior verification setting screen according to the first embodiment of this invention.
Figure 12:
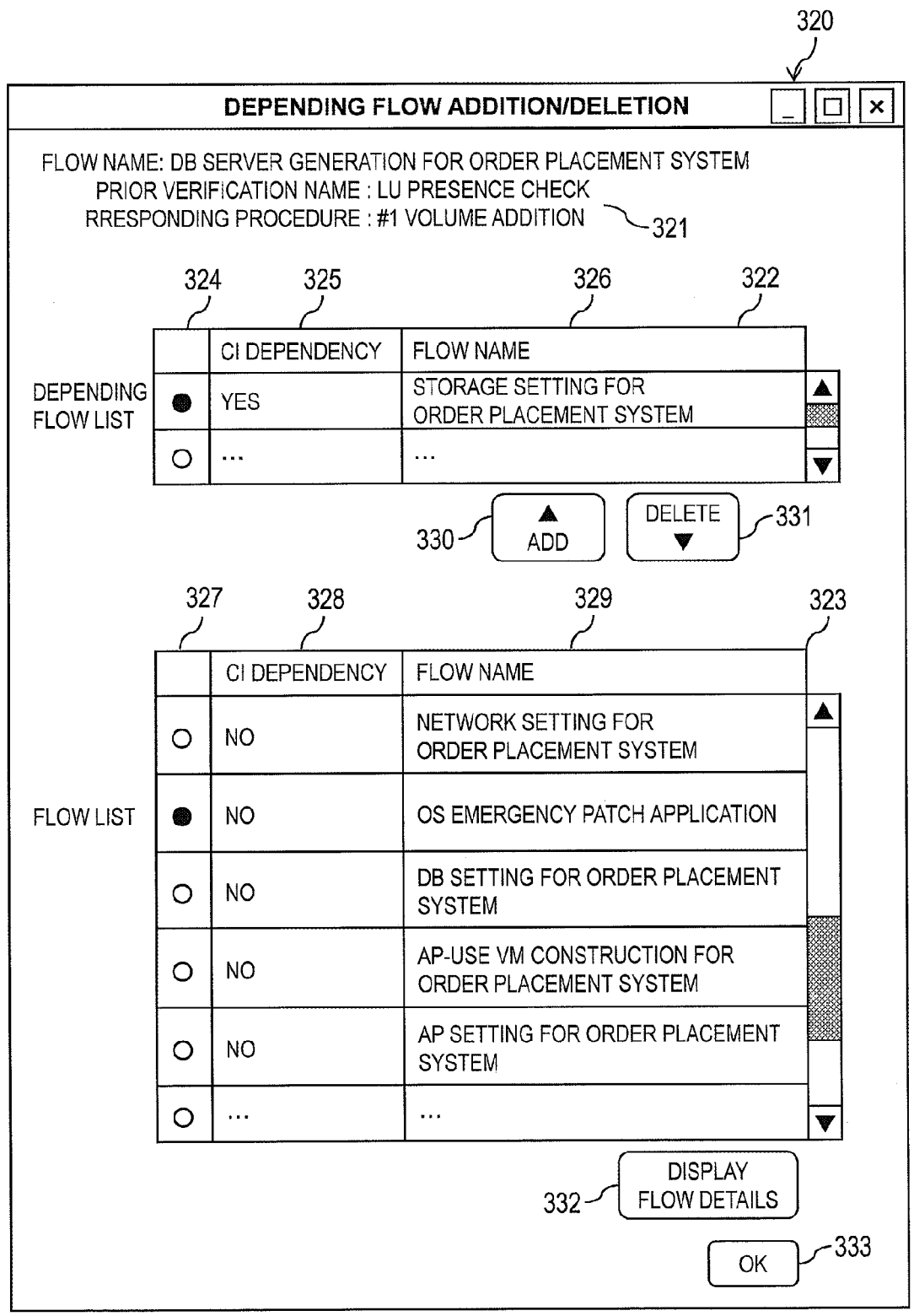
FIG. 12 is an explanatory diagram of the depending flow addition/deletion screen according to the first embodiment of this invention.

The processor of the operation terminal 110, which is not shown, executes the dependency list display program 112, and displays, based on an input dependency, a prior verification setting screen 300 of allowing the administrator to check prior verification processing to be executed for the workflow program to be added and a depending flow addition/deletion screen 320 of allowing the administrator to add/delete the dependencies of the workflow program to be added (506). Referring to FIG. 11, a detailed description is given of the prior verification setting screen 300. Referring to FIG. 12, a detailed description is given of the depending flow addition/deletion screen 320.

Then, the processor, which is not shown, of the operation terminal 110 executes the dependency setting program 111, registers the information input on the prior verification setting screen 300 and the information input on the depending flow addition/deletion screen 320 to the flow list table 210, the procedure list table 220, and the prior verification list table 230 (507), and finishes the processing.

FIG. 11 is an explanatory diagram of the prior verification setting screen 300 according to the first embodiment of this invention.

The prior verification setting screen 300 is a screen for the administrator to edit contents of the prior verification processing of a workflow program to be added. In other words, the prior verification setting screen 300 is a screen for editing a content of a record corresponding to the workflow program to be added of the prior verification list table 230.

The prior verification setting screen 300 is displayed on the output device, which is not shown, of the operation terminal 110 or the output device 204 of the management server 101 by the processing in Step 506 illustrated in FIG. 10. It should be noted that the prior verification setting screen 300 may be displayed at an execution timing other than the execution timing of the processing in Step 506 illustrated in FIG. 10. In this case, the prior verification setting screen 300 is a screen for the administrator to edit contents of the prior verification processing of a predetermined workflow program.

The prior verification setting screen 300 includes a flow name display area 301, a verification item list table display area 302, a verification item adding button 310, a depending flow setting button 312, and an OK button 313. It should be noted that the prior verification setting screen 300 may display information other than the information described above, or may not always display all of the information.

A name of a workflow program to be added is displayed in the flow name display area 301. The verification item list table display area 302 includes radio buttons 303, verification IDs 304, prior verification names 305, verification results 306, corresponding procedures 307, and depending flow lists 308

The administrator uses the radio button 303 to select a record. A record having a radio button 303 in black represents that the record is currently selected. A verification ID of prior verification processing corresponding to the workflow program to be added is displayed in the verification ID 304. Specifically, the processor, which is not shown, of the operation terminal 110 or the processor 200 of the management server 101 (hereinafter referred to as processor) identifies a record having a flow ID 232 to which identification information for the workflow program to be added is registered out of the records of the prior verification list table 230, and displays a verification ID registered to the verification ID 231 of the identified record in the verification ID 304.

The name of the prior verification processing having the verification ID displayed in the verification ID 304 is displayed on the prior verification name 305. Specifically, the processor displays, in the prior verification name 305, the name of prior verification processing registered to the prior verification name 233 of the record having the verification ID 231 to which the verification ID displayed on the verification ID 304 is registered out of the records of the prior verification list table 230.

An execution result of the prior verification processing executed in the processing in Step 504 is registered to the verification result 306. Specifically, the execution result of the prior verification processing is registered to the prior verification result list table 240 in the processing in Step 504, and the processor displays, in the verification result 306, an execution result registered to the verification result 243 of the record having a verification ID 241 coincident with the verification ID displayed in the verification ID 304 out of the records of the prior verification result list table 240.

Only the execution result of the latest prior verification processing is displayed in the verification result 306, but a plurality of execution results of past prior verification processing may be displayed.

An execution sequence and a work procedure name of a work procedure corresponding to the prior verification processing having the verification ID displayed in the verification ID 304 is displayed in the corresponding procedure 307. Specifically, the processor acquires an execution sequence registered to the corresponding procedure 234 of a record having a verification ID 241 coincident with the verification ID displayed in the verification ID 304 out of the records of the prior verification list table 230. Then, the processor acquires a name of a work procedure registered to the procedure name 223 of a record having a flow ID 221 coincident with the identification information for the workflow program to be added, and having a procedure number 222 coincident with the acquired work procedure out of the records of the procedure list table 220. Then, the processor displays the acquired execution sequence and the acquired name of the work procedure in the corresponding procedure 307.

For example, "#1 volume addition" represents a work procedure having identification information "4" and an execution sequence "1" of the workflow program.

The name of a workflow program on which the work procedure corresponding to the prior verification processing having the verification ID displayed in the verification ID 304 depends is displayed in the depending flow list 308. Specifically, the processor displays, in the depending flow list 308, the identification information for the workflow program registered to the depending flow ID 237 of the record having the verification ID 241 coincident with the verification ID displayed in the verification ID 304 out of the records of the prior verification list table 230.

It should be noted that the verification item list table display area 302 is a tabular form, may display information other than the radio buttons 303, the verification IDs 304, the prior verification names 305, the verification results 306, the corresponding procedures 307, and the depending flow lists 308, and does not need to display all of them. Moreover, the verification item list table display area 302 may be in a list form or a string form.

When the verification item adding button 310 is operated, the processor displays a prior verification processing adding screen (not shown) for adding prior verification processing. The prior verification processing adding screen includes a display area for inputting the respective types of item 231 to 238 of the prior verification list table 230. When the processor receives an input of information on the prior verification processing to be added via the prior verification processing adding screen, the processor registers information on the input prior verification processing to the prior verification list table 230.

When the depending flow setting button 312 is operated, the processor displays the depending flow addition/deletion screen 320 for setting workflow programs on which work procedures of the prior verification processing selected by the radio button 303 depend. A detailed description is given of the depending flow addition/deletion screen 320 referring to FIG. 12.

When the OK button 313 is operated, the processor closes the prior verification setting screen 300.

Overlapping pieces of prior verification processing are displayed on the prior verification setting screen 300 illustrated in FIG. 11, and it is assumed that the prior verification setting screen 300 is displayed by the processing in Step 506 without the processing in Step 503.

FIG. 12 is an explanatory diagram of the depending flow addition/deletion screen 320 according to the first embodiment of this invention.

The depending flow addition/deletion screen 320 is a screen for adding or deleting a workflow program on which a work procedure of prior verification processing selected by the radio button 303 on the prior verification setting screen 300 depends.

The depending flow addition/deletion screen 320 is displayed on the output device, which is not shown, of the operation terminal 110 or the output device 204 of the management server 101 when the depending flow setting button 312 is operated on the prior verification setting screen 300. It should be noted that the depending flow addition/deletion screen 320 may be displayed at a timing other than the timing described above.

The depending flow addition/deletion screen 320 includes a prior verification content display area 321, a depending flow list table display area 322, a flow list table display area 323, an add button 330, a delete button 331, a flow detail display button 332, and an OK button 333. It should be noted that the depending flow addition/deletion screen 320 may display information other than the information described above, or may not always display all of the information.

The prior verification content display area 321 includes a flow name display area, a prior verification name display area, and a corresponding procedure display area.

The name of the operation flow program displayed in the flow name display area 301 is displayed in the flow name display area when the depending flow setting button 312 is operated on the prior verification setting screen 300.

The name of the prior verification processing displayed in the prior verification name 305 of the record selected by the radio button 303 is displayed in the prior verification name display area when the depending flow setting button 312 is operated on the prior verification setting screen 300.

The content displayed in the corresponding procedure 307 of the record selected by the radio button 303 is displayed in the corresponding procedure display area when the depending flow setting button 312 is operated on the prior verification setting screen 300.

A list of workflow programs on which the work procedure displayed in the corresponding procedure display area depends are displayed in a tabular form in the depending flow list table display area 322, and the depending flow list table display area 322 includes radio buttons 324, CI dependencies 325, and flow names 326. The depending flow list table display area 322 may display information other than the information described above, or may not display all of them. Moreover, the depending flow list table display area 322 may not be in the tabular form, and may be in a list form or a string form.

A list of workflow programs on which the work procedure displayed in the corresponding procedure display area does not depend are displayed in a tabular form in the flow list table display area 323, and the flow list table display area 323 includes radio buttons 327, CI dependencies 328, and flow names 329. The flow list table display area 323 may display information other than the information described above, or may not display all of them. Moreover, the flow list table display area 323 may not be in the tabular form, and may be in a list form or a string form.

The administrator or the like uses the radio buttons 324 and 327 to select records in the depending flow list table display area 322 and the flow list table display area 323.

Records having radio buttons 324 and 327 in black represent that the records are currently selected.

Names of the workflow programs are displayed in the flow names 326 and 329. If the work procedure displayed in the corresponding procedure display area depends on each of the workflow programs displayed in the flow names 326 and 329, "Yes" is displayed in each of the CI dependencies 325 and 328, and if the work procedure displayed in the corresponding procedure display area does not depend on each of the workflow programs displayed in the flow names 326 and 329, "No" is displayed.

When the add button 330 is operated, the workflow program of the record selected by means of the radio button 327 in the flow list table display area 323 is set as a workflow program on which the work procedure displayed in the corresponding procedure display area depends, is deleted from the flow list table display area 323, and is added to the depending flow list table display area 322.

When the delete button 331 is operated, the workflow program of the record selected by means of the radio button 324 in the depending flow list table display area 322 is set as a workflow program on which the work procedure displayed in the corresponding procedure display area does not depend, is deleted from the depending flow list table display area 322, and is added to the flow list table display area 323.

When the flow detail display button 332 is operated, the processor acquires detailed information on the workflow program selected by using the radio button 327 in the flow list table display area 323 from the flow list table 210, and displays the acquired information.

When the OK button 333 is operated, the processor considers that the work procedure displayed in the corresponding procedure display area depends on the workflow programs displayed in the depending flow list table display area 322, and registers the identification information for each of the workflow programs to the depending flow ID 237 of a record of the prior verification list table 230 corresponding to the work procedure displayed in the corresponding procedure display area.

FIG. 13 is a flowchart of the prior verification execution processing according to the first embodiment of this invention.

The prior verification execution processing may have processing sequence different from that illustrated in FIG. 13, may include processing other than that illustrated in FIG. 13, or may not need to include all the processing illustrated in FIG. 13.

The prior verification execution processing is invoked from the processing in Step 504 illustrated in FIG. 10 and processing in Step 569 (described later) illustrated in FIG. 15, and is executed. It should be noted that the prior verification execution processing may be executed at a timing other than these timings. For example, such a condition that a work procedure included in a workflow program does not satisfy an execution condition can be detected earlier by executing the prior verification execution processing at a predetermined cycle (such as at an interval of 5 minutes).

Moreover, the management server 101 may collect the configuration information on the server apparatus 103, the storage apparatus 104, and the network apparatus 105 at a predetermined cycle, and may execute the prior verification execution processing illustrated in FIG. 13 when the configuration information is changed.

As the configuration information on the server apparatus 103 collected by the management server 101, absence/presence of a host, an OS name, an OS version, an OS patch level, a host name, installed software, an operation process, an IP address, a communication state, and the like are conceivable. Moreover, if the virtual machine 108 operates on the server apparatus 103, such a case that the number of virtual machines 108 operating on a hypervisor is changed is conceivable.

Moreover, as the configuration information on the storage apparatus 104 collected by the management server 101, an array group, an LU, a storage hierarchy, and the like are conceivable. Moreover, as the configuration information on the network apparatus 105 collected by the management server 101, an IP address, a VLAN, an STP, a ZONE, and the like are conceivable.

It should be noted that the management server 101 may collect configuration information other than that described above.

Moreover, when the operation subject host name 225 of the procedure list table 220 is changed, prior verification processing for a workflow program including an operation procedure having the changed operation subject host name 225 may be executed.

It should be noted that the prior verification execution processing is realized by the processor 200 executing the prior verification execution program 123.

First, the processor 200 refers to the prior verification list table 230, thereby acquiring pieces of prior verification processing having the valid/invalid 238 to which "valid" is registered from prior verification processing corresponding to a workflow program for which the prior verification processing is executed (511). If the prior verification execution processing is invoked by the processing in Step 504 illustrated in FIG. 10, the workflow program for which the prior verification processing is executed is the workflow program to be added.

If a workflow program is added, "valid" is registered to the valid/invalid 238 of all records corresponding to the workflow program to be added in the prior verification list table 230 at the stage of the processing in Step 504 illustrated in FIG. 10.

Then, the processor 200 selects one piece of prior verification processing for which the prior verification execution processing has not been executed as the prior verification processing subject to processing out of the pieces of prior verification processing acquired by the processing in Step 511, and repeats processing in Steps 512 to 517 until the prior verification execution processing is executed for all the pieces of the prior verification processing acquired by the processing in Step 511 (512).

Then, the processor 200 resolves variables enclosed by two "%"s in the verification script 235 of the prior verification processing subject to processing each selected by the processing in Step 512, thereby determining parameters in the verification script of the prior verification processing subject to processing (513).

Specifically, the processor 200 acquires information registered to the operation subject host name 225 and the parameter 226 of a record of an operation procedure corresponding to the prior verification processing subject to processing in the procedure list table 220, and replaces the variables enclosed by the two "%"s in the verification script 235 by the acquired information.

Then, the processor 200 transfers the verification script of the prior verification processing subject to processing to a host (verification execution host) identified by the identification information for a host registered to the verification execution host 236 (514). An arbitrary data transfer protocol such as ftp, rcp, scp, sftp, and http is used for the transfer of the verification script. It should be noted that the verification script may be configured so that the verification script can be referred to by the verification script by means of a file sharing system such as nfs and cifs in the processing in Step 514. Moreover, the verification script may be configured in advance so that the verification script can be referred to by the verification execution host. The processor 200 may transfer an executable file, or an archive file in the zip format or the like in place of the script.

The processor 200 refers to the authentication information list table 270, thereby logging in the verification execution host in the processing in Step 514.

Then, the processor 200 controls the verification execution host to execute the verification script transferred by the processing in Step 514 (515). It should be noted that the processor 200 may control the verification execution host to execute an executable file in place of the verification script, or may control the verification execution host to execute a script or an executable file acquired by controlling the verification execution host to decompress an archive file in the zip format or the like in place of the verification script. In other words, the verification execution host actually executes the prior verification processing in the processing in Step 515. It should be noted that the processor 200 refers to the authentication information list table 270, thereby logging in the verification execution host in the processing in Step 515.

Then, the processor 200 acquires an execution result of the prior verification processing in the processing in Step 515 from the verification execution host, and registers the acquired execution result to the prior verification result list table 240 (516).

Then, if the processing in Steps 513 to 516 is executed for all the pieces of the prior verification processing acquired by the processing in Step 511, the processor 200 proceeds to processing in Step 518, and if the processing in Steps 513 to 516 is not executed for all the pieces of the prior verification processing acquired by the processing in Step 511, the processor 200 returns to the processing in Step 512 (517).

If the processing in Steps 513 to 516 is executed for all the pieces of the prior verification processing acquired by the processing in Step 511, the processor 200 registers the verification results to the verification result 217 of a record corresponding to the workflow program subject to processing in the flow list table 210 (518), and finishes the processing. Specifically, if the execution result of the prior verification processing corresponding to at least one work procedure included in the workflow program subject to processing is failure, "verification failed" is registered to the verification result 217, and if the execution results of the prior verification processing corresponding to all the work procedures included in the workflow program subject to processing are successful, "verified" is registered to the verification result 217. Moreover, if the prior verification processing corresponding to at least one of the work procedures included in the workflow program subject to processing is not executed, "partially unverified" is registered to the verification result 217.

FIG. 14 is a flowchart of the dependency generation processing according to the first embodiment of this invention.

The dependency generation processing is invoked by the processing in Step 505 illustrated in FIG. 10, and is executed. It should be noted that the dependency generation processing may be executed at a timing other than that described above. In FIG. 14, a workflow program subject to processing is referred to as own flow.

The dependency generation processing is realized by the processor 200 executing the dependency generation program 121.

First, the processor 200 selects one work procedure for which the dependency generation processing has not been executed as a work procedure subject to processing (own procedure) out of work procedures included in the own flow, and repeats processing in Steps 521 to 540 until the dependency generation processing is executed for all the work procedures included in the own flow (521).

Then, the processor 200 identifies configurations (changed CIs) of management subject resources to be changed by the own procedure selected by the processing in Step 521, and configurations (depending CIs) of management subject resources required to be generated or set for executing the own procedure, registers the identified changed CIs to the changed CI 227 of a record corresponding to the own procedure in the procedure list table 220, and registers the identified depending CIs to the depending CI 228 (522).

Specifically, the processor 200 identifies the type of the own procedure, and refers to the procedure type dependency list table 250, thereby acquiring information registered to the changed CI 252 and the depending CI 253 of the record corresponding the type of the own procedure. Moreover, the processor 200 replaces each variable enclosed by two "%"s of the information registered to the acquired changed CI 252 and depending CI 253 by the information registered to the operation subject host name 225 and the parameter 226 of the procedure list table 220, thereby identifying the changed CIs and the depending CIs.

Then, the processor 200 refers to the flow list table 210, and acquires workflow programs (workflow programs which have not been executed yet or are being executed) each of which has the execution start time and date earlier than those of the own flow, and have not been completed in execution (524).

Then, the processor 200 selects one workflow program for which processing in Steps 526 to 531 has not been executed out of the workflow programs acquired by the processing in Step 524, and repeats the processing in Steps 525 to 531 until the processing in Steps 526 to 531 is executed for all the workflow programs acquired by the processing in Step 524 (525). The workflow program selected by the processing in Step 525 is referred to as past other flow.

Then, the processor 200 selects one work procedure for which processing in Steps 527 to 530 has not been executed out of work procedures included in the past other flow selected by the processing in Step 525, and repeats the processing in Steps 526 to 530 until the processing in Steps 527 to 530 is executed for all the work procedures included in the past other flow (526). The work procedure selected by the processing in Step 526 is referred to as past other procedure.

Then, the processor 200 refers to the procedure list table 220, thereby identifying the changed CI of the past other procedure, and determining whether the same management subject resources are included in the depending CI of the own procedure and the changed CI of the past other procedure (527).

If it is determined that the same management subject resources are included in the depending CI of the own procedure and the changed CI of the past other procedure by the processing in Step 527, the processor 200 adds the identification information for the workflow program including the past other procedure to the depending flow 229 of a record corresponding to the own procedure in the procedure list table 220 (528). Moreover, the processor 200 adds identification information for the workflow program including the past other procedure to the depending flow ID 237 of a record corresponding to the prior verification processing of the own procedure in the prior verification list table 230.

Then, the processor 200 adds the identification information for the workflow program including the past other procedure to the depending flow ID 214 of a record corresponding to the workflow program including the own procedure in the flow list table 210 (529), and proceeds to processing in Step 530. Moreover, the processor 200 adds the identification information for the workflow program including the own procedure to the depended flow ID 215 of a record corresponding to the workflow program including the past other procedure in the flow list table 210 in the processing in Step 529.

On the other hand, if it is determined that the same management subject resource is not included in the depending CI of the own procedure and the changed CI of the past other procedure in the processing in Step 527, the processor does not execute the processing in Steps S528 and 529, and proceeds to processing in Step 530.

In the processing in Step 530, if the processing in Steps 527 to 530 has been executed for all the work procedures included in the past other flow, the processor 200 proceeds to processing in Step 531, and if the processing in Steps 527 to 530 has not been executed for all the work procedures included in the past other flow, the processor 200 returns to the processing in Step 526 (530).

In the processing in Step 531, if the processing in Steps 526 to 531 is executed for all the workflow programs acquired by the processing in Step 524, the processor 200 proceeds to processing in Step 532, and if the processing in Steps 526 to 531 is not executed for all the workflow programs acquired by the processing in Step 524, the processor 200 returns to the processing in Step 525 (531).

The processor 200 can automatically identify workflow programs on which the workflow program subject to processing depends by executing the processing in Steps 525 to 531.

Then, the processor 200 refers to the flow list table 210, and acquires workflow programs having the execution start time and date later than the own flow (532).

Then, the processor 200 selects one workflow program for which processing in Steps 534 to 540 has not been executed out of the workflow programs acquired by the processing in Step 532, and repeats the processing in Steps 533 to 540 until the processing in Steps 534 to 540 is executed for all the workflow programs acquired by the processing in Step 532 (533). It should be noted that the workflow program selected by the processing in Step 533 is referred to as future other flow.

Then, the processor 200 selects one work procedure for which processing in Steps 535 to 539 has not been executed out of work procedures included in the future other flow selected by the processing in Step 533, and repeats the processing in Steps 534 to 539 until the processing in Steps 535 to 539 is executed for all the work procedures included in the future other flow (534). The work procedure selected by the processing in Step 534 is referred to as future other procedure.

Then, the processor 200 refers to the procedure list table 220, thereby identifying the depending CI of the future other procedure, and determining whether the same management subject resources are included in the changed CI of the own procedure and the depending CI of the future other procedure (535).

If it is determined that the same management subject resources are included in the changed CI of the own procedure and the depending CI of the future other procedure by the processing in Step 535, the processor 200 adds the identification information for the own flow to the depending flow 229 of a record corresponding to the future other procedure in the procedure list table 220 (536). Moreover, the processor 200 adds identification information for the own flow to the depending flow ID 237 of a record corresponding to the prior verification processing of the future other procedure in the prior verification list table 230.

Then, the processor 200 adds the identification information for the own flow to the depending flow ID 214 of the record corresponding to the future other flow in the flow list table 210 (537), and proceeds to the processing in Step 538. Moreover, the processor 200 adds the identification information for the future other flow to the depended flow ID 215 of the record corresponding to the own flow in the flow list table 210 in the processing in Step 537.

On the other hand, if it is determined that the same management subject resource is not included in the changed CI of the own procedure and the depending CI of the future other procedure in the processing in Step 535, the processor 200 does not execute the processing in Steps S536 and 537, and proceeds to processing in Step 538.

In the processing in Step 538, if the processing in Steps 535 to 537 has been executed for all the work procedures included in the future other flow, the processor 200 proceeds to processing in Step 539, and if the processing in Steps 535 to 537 has not been executed for all the work procedures included in the future other flow, the processor 200 returns to the processing in Step 534 (538).

In the processing in Step 539, if the processing in Steps 534 to 540 has been executed for all the workflow programs acquired by the processing in Step 532, the processor 200 proceeds to processing in Step 540, and if the processing in Steps 534 to 540 has not been executed for all the workflow programs acquired by the processing in Step 532, the processor 200 returns to the processing in Step 533 (539).

In the processing in Step 540, if the processing in Steps 522 to 540 has been executed for all the work procedures included in the own flow, the processor 200 finishes the processing, and if the processing in Steps 522 to 540 has not been executed for all the work procedures included in the own flow, the processor 200 repeats the processing in Step 521 (540).

The processor 200 can automatically identify workflow programs which depend on the workflow program subject to processing by executing the processing in Steps 532 to 539.

FIG. 15 is a flowchart of the flow execution processing according to the first embodiment of this invention.

The flow execution processing is realized by the processor 200 of the management server 101 executing the prior verification execution program 123 and the flow execution program 125 when execution start time and date of a workflow program are reached. A workflow program which reaches the execution start time and date is referred to as own flow. Even if a workflow program has not reached the execution start time and date, the flow execution processing may be executed. The flow execution processing may include processing other than the processing illustrated in FIG. 15, or may not always include all the processing illustrated in FIG. 15.

First, the processor 200 executes the prior verification execution program 123, thereby executing the prior verification execution processing for the own flow (561). The prior verification execution processing is the same as that illustrated in FIG. 13, and a description thereof is therefore omitted.

Then, the processor 200 executes the prior verification execution program 123, and determines whether all the execution results of the prior verification execution processing executed by the processing in Step 561 are successful or not (562).

If it is determined in the processing in Step 562 that all the execution results of the prior verification execution processing executed by the processing in Step 561 are not successful, the processor 200 executes the prior verification execution program 123, displays such a situation that all the execution results of the prior verification processing for the own flow are not successful on the output device, which is not shown, of the operation terminal 110 or the output device 204 of the management server 101 (563), and finishes the processing without executing the own flow.

On the other hand, if it is determined in the processing in Step 562 that all the execution results of the prior verification execution processing executed by the processing in Step 561 are successful, the processor 200 executes the flow execution program 125, and controls operation subject hosts to execute the respective work procedures included in the own flow (564). In this case, the processor 200 refers to the authentication information list table 270, and logs in the operation subject hosts.

Then, the processor 200 executes the prior verification execution program 123, thereby determining whether an execution result of the own flow executed by the processing in Step 564 is successful or not (565).

If it is determined that the execution result of the own flow is not successful in the processing in Step 565, the processor 200 finishes the processing.

On the other hand, if it is determined that the execution result of the own flow is successful in the processing in Step 565, the processor 200 executes the prior verification execution program 123, and refers to the prior verification list table 230, thereby updating the valid/invalid 238 of a record having the depending flow ID 237 to which the identification information for the own flow is registered to "valid" (566). This is because a configuration of a management subject resource required for the execution of the prior verification processing represented by the record comes to satisfy an execution condition of the prior verification processing as a result of the execution of the own flow. As a result, if the prior verification processing becomes executable, the execution of the prior verification processing is permitted, and such a situation that even if prior verification processing cannot be executed, the prior verification processing is executed and fails, and the failure is presented to the administrator is prevented.

Then, the processor 200 executes the prior verification execution program 123, and refers to the flow list table 210, thereby acquiring workflow programs depending on the own flow (567). Specifically, the processor 200 acquires workflow programs identified by identification information registered to the depended flow ID 215 of the record corresponding to the own flow in the flow list table 210.

Then, the processor 200 executes the prior verification execution program 123, and selects one workflow program for which processing in Steps 569 and 570 has not been executed out of the workflow programs acquired by the processing in Step 567, and repeats the processing in Steps 568 to 570 until the processing in Steps 569 and 570 is executed for all the workflow programs acquired by the processing in Step 567 (568).

Then, the processor 200 executes the prior verification execution program 123, thereby executing the prior verification execution processing for the workflow program selected by the processing in Step 568 (569).

Then, if the processing in Step 569 is executed for all the workflow programs acquired by the processing in Step 567, the processor 200 proceeds to processing in Step 571, and if the processing in Step 569 is not executed for all the workflow programs acquired by the processing in Step 567, the processor 200 returns to the processing in Step 568 (570).

If the processing in Step 569 is executed for all the workflow programs acquired by the processing in Step 567, the processor 200 executes the prior verification execution program 123, displays an execution result of the prior verification processing executed by the processing in Step 569 on the output device, which is not shown, of the operation terminal 110 or the output device 204 of the management server 101 (571), and finishes the processing.

As a result, the processor 200 identifies a workflow program (depending workflow program) execution of which is made available by a configuration of a management subject resource through execution of a workflow program which has reached execution start time and date, and executes the prior verification processing for the identified workflow program. Thus, when the depending workflow program becomes executable, the prior verification processing for the depending workflow program is immediately executed, and the administrator can quickly detect a defect or the like of the depending workflow program.

As a result, according to this embodiment, before a workflow program is executed, the prior verification processing for the workflow program is executed, and hence the administrator can know the possibility of failure in execution of the workflow program in advance.

Moreover, according to this embodiment, a verification script for executing prior verification processing corresponding to a work procedure included in a workflow program is automatically generated, and hence labor of the administrator for manually generating the verification script can be reduced.

Moreover, according to this embodiment, a dependency between workflow programs is automatically generated. Therefore, labor of the administrator for manually generating the dependency between the workflow programs can be reduced, and a dependency between the workflow programs is prevented from being generated by mistake.

Second Embodiment

Figure 16:
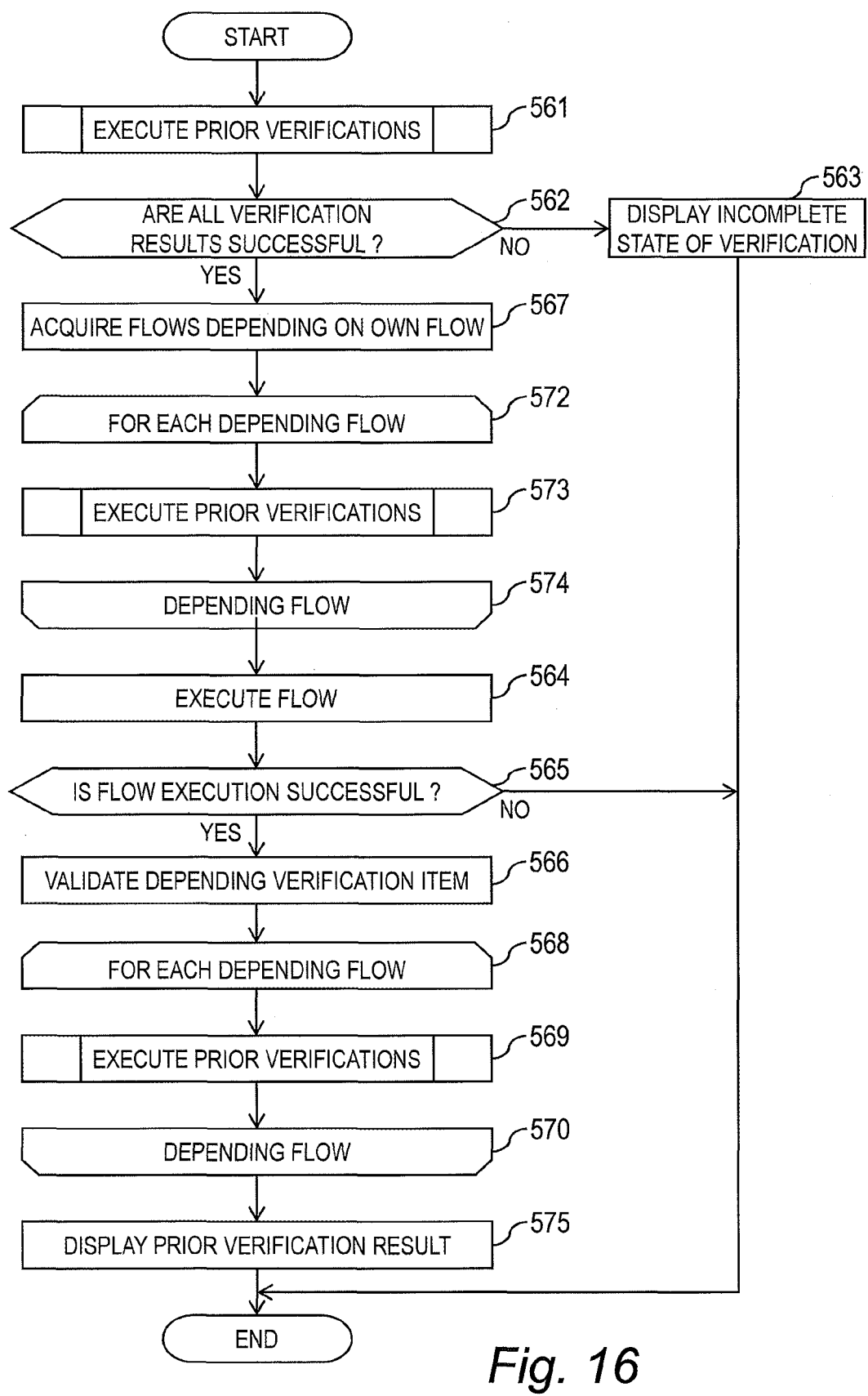
FIG. 16 is a flowchart of the flow execution processing according to a second embodiment of this invention.

Now, a description is given of a second embodiment of this invention referring to FIGS. 16 and 17.

In the flow execution processing illustrated in FIG. 15 according to the first embodiment, after a workflow program subject to execution is executed, the prior verification processing is executed for workflow programs depending on the workflow program. In this embodiment, before and after a workflow program subject to execution is executed, the prior verification processing is executed for workflow programs depending on the workflow program.

As a result, for example, if the execution result of the prior verification processing for a workflow program depending on the workflow program subject to execution changes from success to failure before or after the workflow program subject to execution is executed, the administrator can recognize that the configuration of a management subject resource is not correctly changed by the execution of the workflow program.

FIG. 16 is a flowchart of the flow execution processing according to the second embodiment of this invention. It should be noted that, in the processing of FIG. 16, the same processing as that of FIG. 15 is denoted by the same reference numeral, and a description there of is therefore omitted.

If the processing in Step 562 determines that all the execution results of the prior verification execution processing executed by the processing in Step 561 are not successful, the processor 200 proceeds to processing in Step 567, refers to the flow list table 210, and acquires workflow programs depending on the own flow.

Then, before the processor 200 controls an operation subject host to execute each of the operation procedures included in the own flow by the processing in Step 564, the processor 200 executes the prior verification processing for the workflow programs depending on the own flow by the processing in Steps 572 to 574. The processing in Steps 572 to 574 is the same as the processing in Steps 568 to 570, and a description thereof is therefore omitted.

Moreover, after the processing in Step 570 is executed, the processor 200 displays a prior verification result comparison screen 360 on the output device, which is not shown, of the operation terminal 110 or the output device 204 of the management server 101 (575), and finishes the processing. Referring to FIG. 17, a detailed description is given of the prior verification result comparison screen 360.

FIG. 17 is an explanatory diagram of the prior verification result comparison screen 360 according to the second embodiment of this invention.

The prior verification result comparison screen 360 includes a flow description display area 361, a flow display button 362, a prior verification result comparison table display area 363, and an OK button 364.

The name of the workflow program executed by the processing in Step 564 in FIG. 16, an execution start time of the workflow program, and an execution end time of the workflow program are displayed in the flow description display area 361. It should be noted that both the execution start time and the execution end time of the workflow program do not always need to be displayed, and at least one of them only needs to be displayed.

When the flow display button 362 is operated, the processor 200 identifies a workflow program including at least one of the execution start time and the execution end time displayed in the flow description display area 361 in an execution period, and displays the identified workflow program.

The prior verification result comparison table display area 363 is in a tabular form, and includes flow names 370, verification IDs 371, prior verification names 372, verification results before execution 373, verification results after execution 374, and reasons for change in verification result 375. It should be noted that the prior verification result comparison table display area 363 may include information other than the items described above, or may not display at least one of the items. For example, the prior verification result comparison table display area 363 may display the prior verification processing validated by the processing in Step 566 illustrated in FIG. 16.

Moreover, the prior verification result comparison table display area 363 may be displayed in a display form other than the tabular form such as a list form or a string form.

The prior verification result comparison table display area 363 is displayed for the administrator or the like to compare the execution result of the prior verification processing executed by the processing in Step 573 and the execution result of the prior verification processing executed by the processing in Step 569 with each other.

A name of a workflow program depending on a workflow program subject to execution, in other words, a workflow program acquired by the processing in Step 567 is displayed in the flow name 370.

Identification information for the prior verification processing executed for the workflow program identified by the name displayed in the flow name 370 is displayed in the verification ID 371. Moreover, the name of the prior verification processing identified by the identification information displayed in the verification ID 371 is displayed in the prior verification name 372.

An execution result of the prior verification processing executed by the processing in Step 573 is displayed in the verification result before execution 373. In other words, an execution result of the prior verification processing executed for a workflow program depending on the workflow program subject to execution before the execution of the workflow program subject to execution is displayed in the verification result before execution 373.

An execution result of the prior verification processing executed by the processing in Step 569 is displayed in the verification result after execution 374. In other words, an execution result of the prior verification processing executed for a workflow program depending on the workflow program subject to execution after the execution of the workflow program subject to execution is displayed in the verification result after execution 374.

It should be noted that the execution results of the prior verification processing are displayed as icons and strings in the verification result before execution 373 and the verification result after execution 374.

If the execution result displayed in the verification result before execution 373 changes to the execution result displayed in the execution result after execution 374, a reason for the change in the execution result is displayed in the reason for change in verification result 375.

As illustrated in a record having "12" displayed in the verification ID 371, if the verification result before execution 373 is "partially unverified", and the verification result after execution 374 is "successful verification", "operation environment construction" is displayed in the reason for change in verification result 375. This is because the configuration of the management subject resource is highly possibly changed to the configuration of enabling the execution of the prior verification processing through the execution of another workflow program while the workflow program subject to execution is being executed, or through the execution of the workflow program subject to execution.

Moreover, if the verification result before execution 373 is "partially unverified", and the verification result after execution 374 is "verification failed", which is not shown in FIG. 17, "operation environment construction failure" is displayed in the reason for change in verification result 375. This is because a change in the configuration of the management subject resource is highly possibly failed through the execution of another workflow program while the workflow program subject to execution is being executed, or through the execution of the workflow program subject to execution.

Moreover, as illustrated in a record having "13" displayed in the verification ID 371, if the verification result before execution 373 is "successful verification", and the verification result after execution 374 is "verification failed", "operation environment destruction" is displayed in the reason for change in verification result 375. This is because the configuration of the management subject resource enabling the execution of the prior verification processing is highly possibly changed to the configuration of no longer enabling the execution of the prior verification processing (the configuration of the management subject resource is highly possibly destructed) through the execution of another workflow program while the workflow program subject to execution is being executed, or through the execution of the workflow program subject to execution.

When the OK button 364 is operated, the processor 200 closes the prior verification result comparison screen 360.

As a result, the administrator can recognize that the execution of the workflow program subject to execution, or the execution of another workflow program executed during the execution of the workflow program subject to execution constructs or destructs the configuration of the management subject resource enabling execution of the workflow program depending on the workflow program subject to execution. Moreover, the administrator can also recognize the failure in construction of the configuration of the management subject resource enabling execution of the workflow program depending on the workflow program subject to execution.

If the configuration of a management subject resource is destructed, or the construction of the configuration of a management subject resource fails, the administrator can narrow down a range of investigation for a cause thereof by investigating a workflow program subject to execution displayed in the flow description display area 361 or a workflow program displayed by operating the flow display button 362 before investigating other workflow programs.

The prior verification result comparison screen 360 is displayed on the output device, which is not shown, of the operation terminal 110 or the output device 204 of the management server 101, but the prior verification result comparison screen 360 may be displayed on an output device other than these output devices.

Third Embodiment

Now, a description is given of a third embodiment of this invention referring to FIG. 18.

In this embodiment, a flow dependency list screen 340 including dependencies between workflow programs and execution results of prior verification processing for the workflow programs is displayed. It should be noted that this embodiment can be applied to the first and second embodiments.

As a result, the administrator can easily recognize the dependency between workflow programs.

FIG. 18 is an explanatory diagram of the flow dependency list screen 340 according to the third embodiment of this invention.

The flow dependency list screen 340 may be displayed by the processing in Step 506 illustrated in FIG. 10, or may be displayed at a timing when a predetermined operation by the administrator or the like is received.

The flow dependency list screen 340 includes a depending flow relationship display area 341, a time and date display area 351, a legend display area 348, and an OK button 352. It should be noted that the flow dependency list screen 340 may include information other than the items described above, or may not display at least one of the items.

The time and date display area 351 includes a start time and date display area and an end time and date display area, and these display areas receive an input of time and date information.

A description is now given of the depending flow relationship display area 341.

The depending flow relationship display area 341 is in a tabular form, and includes depending source flows 342, numbers of direct dependencies 343, numbers of indirect dependencies 344, and depending destination flows 345. It should be noted that the depending flow relationship display area 341 may include information other than the items described above, or may not display at least one of the items. Moreover, the depending flow relationship display area 341 may not be in the tabular form, and may be in a list form or a string form.

Contents displayed in the depending flow relationship display area 341 are generated by the dependency list display program 112 of the operation terminal 110 based on the flow list table 210 and the prior verification list table 230. The depending flow relationship display area 341 represents the relationships between the workflow programs identified by the identification information registered to the depending flow IDs 214 and the depended flow IDs 215 in the flow list table 210, and the execution results of the prior verification processing for workflow programs depending on each of the workflow programs.

Names of workflow programs executed between the start time and date and the end time and date in the time and date display area 351 are displayed in the depending source flow 342 and the depending destination flow 345. If inputs are not received in the time and date display area 351, predetermined workflow programs are displayed in the depending source flow 342 and the depending destination flow 345.

The number of workflow programs depending on the workflow program displayed in the depending source flow 342 is displayed in the number of direct dependencies 343. When a sort button 346 is operated, the depending source flows 342 are sorted in an ascending order or a descending order of the numbers registered to the number of direct dependencies 343.

A sum of the number of workflow programs (directly depending workflow programs) depending on the workflow program displayed in the depending source flow 342 and the number of workflow programs depending on the directly depending workflow programs is displayed in the number of indirect dependencies 344. In other words, the number of workflow programs which are influenced when the workflow program displayed in the depending source flow 342 fails in execution is displayed in the number of indirect dependencies 344. When a sort button 347 is operated, the depending source flows 342 are sorted in an ascending order or a descending order of the numbers registered to the number of indirect dependencies 344.

A description is now given of display contents in intersection parts between the depending source flows 342 and the depending destination flows 345. If the intersection part is a blank, the blank represents that a workflow program displayed in the depending source flow 342 and a workflow program displayed in the depending destination flow 345 do not depend on each other. Moreover, if the intersection part is not blank, and the execution result of the prior verification processing for the workflow program displayed in the depending source flow 342 is displayed, the execution result represents that the workflow program displayed in the depending destination flow 345 depends on the workflow program displayed in the depending source flow 342.

If an icon representing "successful" is displayed in the intersection part, the icon represents that all pieces of prior verification processing for the workflow program displayed in the depending source flow 342 are successful. If an icon representing "partially unverified" is displayed in the intersection part, the icon represents that at least one piece of prior verification processing for the workflow program displayed in the depending source flow 342 is not executed, and the other pieces of prior verification processing are successful. If an icon representing "failed" is displayed in the intersection part, the icon represents that at least one piece of prior verification processing for the workflow program displayed in the depending source flow 342 is failed.

It should be noted that information other than the pieces of information described above may be displayed in the intersection part. For example, the number of successful pieces of the prior verification for the workflow programs displayed in the depending destination flow 345, the number of failed pieces thereof, and the number of unexecuted pieces thereof may be displayed. Moreover, "successful", "partially unverified", and "failed" may be displayed in different colors in the intersection parts.

In the example illustrated in FIG. 16, the administrator can recognize that, regarding "AP setting for order placement system" displayed in the depending destination flow 345, the prior verification processing depending on "DB setting for order placement system" displayed in the depending source flow 342 is "partially unverified", and the prior verification processing depending on "AP-use VM construction for order placement system" displayed in the depending source flow 342 is "failed".

Legends for the execution results of the prior verification processing displayed in the intersection parts between the depending source flows 342 and the depending destination flows 345 are displayed in the legend display area 348. Moreover, only legends checked in checkboxes 350 included in the legend display area 348 are displayed in the intersection parts between the depending source flow 342 and the depending destination flow 345. Moreover, a legend having the checkbox 350 without a check is not displayed in the intersection parts between the depending source flow 342 and the depending destination flow 345. As a result, for example, workflow programs can be narrowed down to workflow programs which become executable as a result of execution of a certain workflow program by checking only the checkbox 350 of partially unverified.

When the OK button 352 is operated, the flow dependency list screen 340 is closed.

The flow dependency list screen 340 is displayed on the output device, which is not shown, of the operation terminal 110 or the output device 204 of the management server 101, but the flow dependency list screen 340 may be displayed on an output device other than these output devices.

As described before, according to this embodiment, the administrator can easily recognize the dependency between workflow programs. Moreover, the administrator can recognize a degree of influence of a workflow program displayed in the depending source flow 342 on other workflow programs by focusing on the number of direct dependencies 343 and the number of indirect dependencies 344. Further, the administrator can recognize which workflow program the prior verification processing depends on, and whether the result of the prior verification processing is successful, failed, or unexecuted.

It should be noted that this invention is not limited to the above-mentioned embodiments, and can include various variations. For example, the above-mentioned embodiments are detailed for the sake of easy understanding of this invention, and this invention is not limited to a case including all the described configurations. Moreover, a part of a configuration of a certain embodiment can be replaced by a configuration of another embodiment, and, to a configuration of a certain embodiment, a configuration of another embodiment can be added. Moreover, to a part of the configuration of each of the embodiment, another component can be added, or the part can be deleted, or replaced by another component.

Moreover, the respective configurations, functions, processing parts, the processing means, and the like in part or entirety may be realized as hardware by designing integrated circuits. Moreover, the respective configurations, functions, and the like may be realized as software by a processor interpreting and executing programs realizing the respective functions. Information on programs, tables, files, and the like for realizing the respective functions may be stored in a recording device such as a memory, a hard disk, and a solid state drive (SSD), and a recording medium such as an IC card, an SD card, and a DVD.

What is claimed is:

1. A computer system, comprising:
a management computer that includes a memory and one or more processors
one or more subject resources communicatively coupled to the management computer, wherein the one or more subject resources include at least one of a server apparatus, a storage apparatus or a network apparatus; and
a display computer communicatively coupled to the management computer,
wherein the memory stores at least:
validity information, wherein the validity information indicates whether to execute prior verification processing for a particular work procedure, and
dependency information for the particular work procedure; and
wherein the one or more processors:
receive an input of a first workflow program and a second workflow program, wherein the first workflow program and the second workflow program each include one or more workflow procedures;
for each of the one or more workflow procedures, determine one or more configuration items (CIs) that are changed by executing the one or more workflow procedures of the first workflow program and the second workflow program, wherein each of the one or more CIs is included in a particular resource of the one or more subject resources;
determine an indication of the dependency between the first workflow program and the second workflow program based on the CIs;
verify an operation environment of the management subject resource associated with the one or more CIs to obtain a prior verification result before execution of the first workflow program or the second workflow program;
transmit, to the display computer, the prior verification result and the indication of the dependency between the first workflow program and the second workflow program on the display computer; and
store in the memory the indication of the dependency between the first workflow program and the second workflow program and the validity information based on the prior verification result.

2. The computer system according to claim 1, further comprising:
   a verification computer communicatively coupled to the management computer, wherein the verification computer checks the operation environment of the one or more subject resources; and
   wherein the one or more processors further:
   verify at least one of whether the management subject resource exists, whether the verification computer is able to communicate with the one or more subject resources,
   determine whether an executable file exists, and
   verify whether an execution command included in the one or more workflow procedures is executable.

3. The computer system according to claim 1, wherein:
   the memory further stores a prior verification method list that registers information on a prior verification method for realizing the prior verification processing for each type of the work procedure; and
   the one or more processors further:
   identify an identifier that indicates the type of the work procedure included in the one or more workflow procedures; and
   refer to the prior verification method list to generate the prior verification method based on information on the prior verification method corresponding to the identifier.

4. The computer system according to claim 1,
   wherein the one or more processors further:
   determine a number of indirect depending workflow programs; and
   determine a number of direct depending workflow programs;
   wherein the display computer further displays a dependency list screen including:
   a first area for displaying a relationship between a predetermined workflow program and a depending workflow program which comes to have an executable configuration by the configuration of the management subject resource changed through execution of the predetermined workflow program;
   a second area for displaying the prior verification result;
   a third area for displaying the number of direct depending workflow programs; and
   a fourth area for displaying the number of indirect depending workflow programs.

* * * * *